US012695603B2

(12) United States Patent
Hanily et al.

(10) Patent No.: US 12,695,603 B2
(45) Date of Patent: Jul. 28, 2026

(54) KEY REUSE IN A CLOUD ENVIRONMENT

(71) Applicant: Oracle International Corporation, Redwood Shores, CA (US)

(72) Inventors: Peter Martin Hanily, Dublin (IE); Ryan Daniel Schilcher, Seattle, WA (US); Christopher Robert Baker, Nashua, NH (US); Jonathan Philip Taimanglo, Arlington, VA (US)

(73) Assignee: Oracle International Corporation, Redwood Shores (CA)

( * ) Notice: Subject to any disclaimer, the term of this patent is extended or adjusted under 35 U.S.C. 154(b) by 108 days.

(21) Appl. No.: 18/789,436

(22) Filed: Jul. 30, 2024

(65) Prior Publication Data

US 2026/0039454 A1    Feb. 5, 2026

(51) Int. Cl.
*H04L 9/08* (2006.01)

(52) U.S. Cl.
CPC .......... _H04L 9/0825_ (2013.01); _H04L 9/0844_ (2013.01)

(58) Field of Classification Search
CPC .... H04L 9/0825; H04L 9/0844; H04L 9/0894
See application file for complete search history.

(56) References Cited

U.S. PATENT DOCUMENTS

| | | | | |
|---|---|---|---|---|
| 2022/0321364 A1* | 10/2022 | Sholtis | .................... | H04L 9/321 |
| 2022/0417036 A1* | 12/2022 | Donlan | ................. | H04L 9/3268 |
| 2024/0160481 A1* | 5/2024 | Ecker | ...................... | H04L 63/08 |
| 2025/0048113 A1* | 2/2025 | Banerjee | ............... | H04W 12/72 |

* cited by examiner

*Primary Examiner* — Hany S. Gadalla
(74) *Attorney, Agent, or Firm* — Mughal Gaudry & Franklin PC

(57) ABSTRACT

Techniques for detected reuse of a public key of a public/private cryptographic key pair within a cloud environment are disclosed. A database maintained within a cloud environment is accessed, the database storing a plurality of public keys. Each public key has a corresponding attribute, and the database further stores a plurality of attributes corresponding to the plurality of public keys. Each public key is associated with either (i) a corresponding user account of a corresponding tenancy of the cloud environment or (ii) a compute instance hosted within a corresponding tenancy of the cloud environment. A number of times a first public key or a first attribute corresponding to the first public key occurring within the database is determined. Responsive to the number of times being equal to or greater than a threshold number, the first public key is tagged as being reused for at least the threshold number of times.

20 Claims, 10 Drawing Sheets

800

Access a database maintained within a cloud environment, the database storing (i) a plurality of public keys, and (ii) a plurality of attributes corresponding to the plurality of public keys — 804

Determine a number of times a first public key or a first attribute corresponding to the first public key occurs within the database — 808

Determine that the number of times is equal to or greater than a threshold number — 812

Tag the first public key as being reused for at least the threshold number of times — 816

Generate an output indicating that the first public key is being reused for at least the threshold number of times — 820

Undertake corrective actions to avoid reuse of the first public key — 824

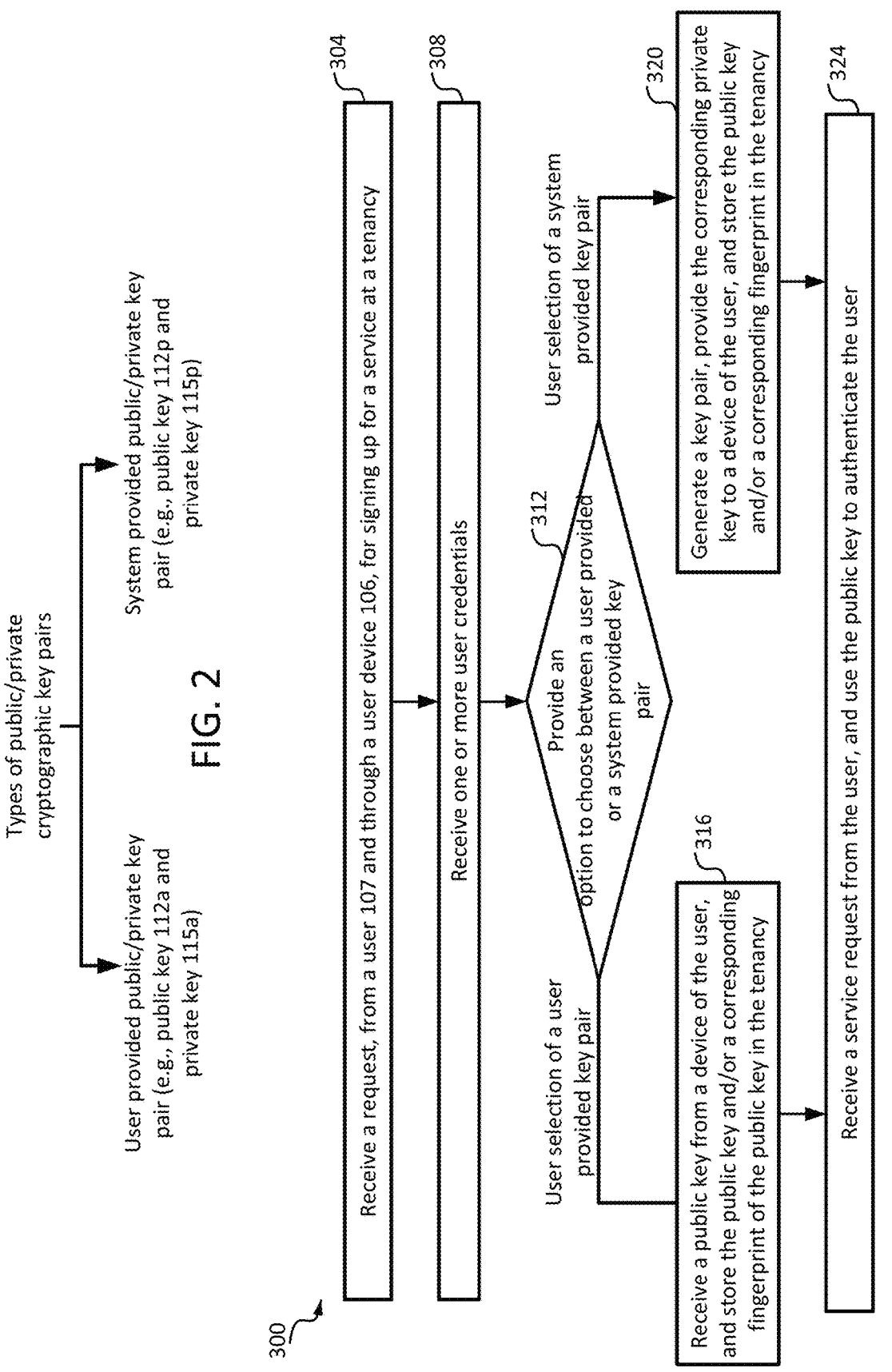

Types of public/private cryptographic key pairs

System provided public/private key pair (e.g., public key 112p and private key 115p)

User provided public/private key pair (e.g., public key 112a and private key 115a)

304 — Receive a request, from a user 107 and through a user device 106, for signing up for a service at a tenancy 308 — Receive one or more user credentials 312 — Provide an option to choose between a user provided or a system provided key pair User selection of a system provided key pair 320 — Generate a key pair, provide the corresponding private key to a device of the user, and store the public key and/or a corresponding fingerprint in the tenancy User selection of a user provided key pair 316 — Receive a public key from a device of the user, and store the public key and/or a corresponding fingerprint of the public key in the tenancy 324 — Receive a service request from the user, and use the public key to authenticate the user

FIG. 3

Table 500a
(for tenancy
104a)

| Public key ID | Public key content | Fingerprint ID | Fingerprint content | Tenancy ID | Key type |
|---|---|---|---|---|---|
| 112a | AAA111 | 114a | A1 | 104a | User provided |
| 112b | BBB222 | 114b | B2 | 104a | User provided |
| 112c | AAA111 | 114c | A1 | 104a | User provided |
| 112d | AAA111 | 114d | A1 | 104a | User provided |

Key used for signing up for a user account
Key used for launching a compute instance
Key used for signing up for a user account
Key used for launching a compute instance

FIG. 5A

Table 500b
(for tenancy
104b)

| Public key ID | Public key content | Fingerprint ID | Fingerprint content | Tenancy ID | Key type |
|---|---|---|---|---|---|
| 112e | CCC123 | 114e | C1 | 104b | User provided |
| 112f | DDD123 | 114f | D1 | 104b | System provided |
| 112g | BBB222 | 114g | B2 | 104b | User provided |
| 112h | CCC123 | 114h | C1 | 104b | System provided |

Key used for signing up for a user account
Key used for signing up for a user account
Key used for signing up for a user account
Key used for launching a compute instance

FIG. 5B

Table 600 (for the cloud environment 100)

| Public key ID | Public key content | Fingerprint ID | Fingerprint content | Tenancy ID | Key type |
|---|---|---|---|---|---|
| 112a | AAA111 | 114a | A1 | 104a | User provided |
| 112b | BBB222 | 114b | B2 | 104a | User provided |
| 112c | AAA111 | 114c | A1 | 104a | User provided |
| 112d | AAA111 | 114d | A1 | 104a | User provided |
| 112e | CCC123 | 114e | C1 | 104b | User provided |
| 112f | DDD123 | 114f | D1 | 104b | System provided |
| 112g | BBB222 | 114g | B2 | 104b | User provided |
| 112h | CCC123 | 114h | C1 | 104b | User provided |
| 112i | EEE111 | 114i | E1 | 104c | User provided |
| 112j | HHH123 | 114j | H1 | 104c | System provided |
| 112m | AAA111 | 114m | A1 | 104e | User provided |
| 112n | FFF111 | 114n | F1 | 104e | System provided |
| 112o | CCC123 | 114o | C1 | 104e | User provided |
| 112p | GGG111 | 114p | G1 | 104e | System provided |

FIG. 6

Report 700

| Public key ID | No. of reuse | Public key ID | Public key content | Fingerprint ID | Fingerprint content | Tenancy ID | Key type |
|---|---|---|---|---|---|---|---|
| 112a | 4 | 112a | AAA111 | 114a | A1 | 104a | User provided |
|  |  | 112c | AAA111 | 114c | A1 | 104a | User provided |
|  |  | 112d | AAA111 | 114d | A1 | 104a | User provided |
|  |  | 112m | AAA111 | 114m | A1 | 104e | User provided |
| 112e | 3 | 112e | CCC123 | 114e | C1 | 104b | User provided |
|  |  | 112h | CCC123 | 114h | C1 | 104b | User provided |
|  |  | 112o | CCC123 | 114o | C1 | 104e | User provided |
| 112b | 2 | 112b | BBB222 | 114b | B2 | 104a | User provided |
|  |  | 112g | BBB222 | 114g | B2 | 104b | User provided |

FIG. 7

KEY REUSE IN A CLOUD ENVIRONMENT

BACKGROUND

A cloud provider provides on-demand, scalable computing resources (a cloud environment) shared across its cloud customers. Maintaining security of the cloud environment involves controlling access to the cloud resources based on permissions specified by the respective cloud customers. A cloud customer can grant permissions for accessing cloud resources that it owns, but the cloud should not be able to grant permissions for accessing cloud resources owned by other customers.

A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer.

BRIEF SUMMARY

In various embodiments, a method includes accessing a database maintained within a cloud environment, the database storing a plurality of public keys, wherein each public key has a corresponding attribute, and the database further storing a plurality of attributes corresponding to the plurality of public keys, and wherein each public key is associated with either (i) a corresponding user account of a corresponding tenancy of the cloud environment or (ii) a compute instance hosted within a corresponding tenancy of the cloud environment; determining a number of times a first public key or a first attribute corresponding to the first public key occurs within the database; determining that the number of times is equal to or greater than a threshold number; tagging the first public key as being reused for at least the threshold number of times; and generating an output indicating that the first public key is being reused for at least the threshold number of times. In an example, the threshold number is a positive integer that is greater than one. In an example, determining the number of times the first public key or the first attribute corresponding to the first public key occurs within the database comprises determining that (i) a first occurrence of the first public key or the first attribute is associated with a first user account of a first tenancy of the cloud environment, and (ii) a second occurrence of the first public key or the first attribute is associated with a second user account of a second tenancy of the cloud environment. In an example, the first tenancy and the second tenancy are different tenancies of the cloud environment. In an example, the first tenancy and the second tenancy are rented out to a same cloud customer, or rented out to a first cloud customer and a second cloud customer, respectively. In an example, the first tenancy and the second tenancy are a same tenancy of the cloud environment.

In an example, determining the number of times the first public key or the first attribute corresponding to the first public key occurs within the database comprises: determining that (i) a first occurrence of the first public key or the first attribute is associated with a first compute instance hosted within a first tenancy of the cloud environment, and (ii) a second occurrence of the first public key or the first attribute is associated with a second compute instance hosted within a second tenancy of the cloud environment. In an example, the first tenancy and the second tenancy are different tenancies of the cloud environment, or a same tenancy of the cloud environment.

In an example, determining the number of times the first public key or the first attribute corresponding to the first public key occurs within the database comprises: determining that (i) a first occurrence of the first public key or the first attribute is associated with a user account of a first tenancy of the cloud environment, and (ii) a second occurrence of the first public key or the first attribute is associated with a compute instance hosted within a second tenancy of the cloud environment. In an example, the first tenancy and the second tenancy are different tenancies of the cloud environment, or a same tenancy of the cloud environment.

In an example, the first attribute is a fingerprint of the first public key, and is generated from the first public key by applying a hash function to the first public key. In an example, the first public key is associated with at least (i) a first user account or (ii) a first compute instance, and wherein the method further comprises: responsive at least in part to the output indicating that the first public key is being reused for at least the threshold number of times, prompting a user of the first user account or the first compute instance to associate a public key, which is different from the first public key, with the first user account or the first compute instance.

In an example, the threshold number is a low threshold number, and wherein the method further comprises: determining that the number of times is equal to or greater than a high threshold number that is greater than the low threshold number; and generating a request to deactivate or delete one or more user accounts or one or more compute instances associated with the first public key. In an example, the method further includes receiving a request to open a first user account or host a first compute instance, the request accompanied by the first public key; and responsive at least in part to (i) the first public key being tagged for being reused for at least the threshold number of times and (ii) receiving the request, rejecting the request and requesting an association of a public key, which is different from the first public key, with the first user account or the first compute instance. In an example, the database stores the plurality of public keys and the plurality of attributes for a single tenancy of the cloud environment. In an example, the database stores the plurality of public keys and the plurality of attributes for a plurality of tenancies of the cloud environment.

In various embodiments, a non-transitory computer-readable medium includes instructions that when executed by one or more processors, cause the one or more processors to perform operations including: accessing a database maintained within a cloud environment, the database storing a plurality of public keys, wherein each public key has a corresponding attribute, and the database further storing a plurality of attributes corresponding to the plurality of public keys, and wherein each public key is associated with either (i) a corresponding user account of a corresponding tenancy of the cloud environment or (ii) a compute instance hosted within a corresponding tenancy of the cloud environment; determining a number of times a first public key or a first attribute corresponding to the first public key occurs within the database; determining that the number of times is equal to or greater than a threshold number; tagging the first public key as being reused for at least the threshold number of times; and generating an output indicating that the first public key as being reused for at least the threshold number of times. In an example, the database one of (i) stores the plurality of public keys and the plurality of attributes for a single tenancy of the cloud environment, or (ii) stores the plurality of public keys and the plurality of attributes for a plurality of tenancies of the cloud environment.

In various embodiments, a system comprises: one or more processors; a storage repository including a database for storing a plurality of public keys, wherein each public key has a corresponding attribute, and the database for further storing a plurality of attributes corresponding to the plurality of public keys, and wherein each public key is associated with either (i) a corresponding user account of a corresponding tenancy of the cloud environment or (ii) a compute instance hosted within a corresponding tenancy of the cloud environment; one or more non-transitory computer-readable media storing instructions, which, when executed by the system, cause the system to perform a set of actions including: accessing the database; determining a number of times a first public key or a first attribute corresponding to the first public key occurs within the database; determining that the number of times is equal to or greater than a threshold number; tagging the first public key as being reused for at least the threshold number of times; and generating an output indicating that the first public key is being reused for at least the threshold number of times. In an example, the database one of (i) stores the plurality of public keys and the plurality of attributes for a single tenancy of the cloud environment, or (ii) stores the plurality of public keys and the plurality of attributes for a plurality of tenancies of the cloud environment.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 2 illustrates two example types of public-private cryptographic key pair that may be used in the cloud environment of FIG. 1.

FIG. 3 illustrates a method depicting an example usage of a public/private cryptographic key pair in the cloud environment of FIG. 1, where the public/private key pair may be used for signing up for a service (such as signing up for a user account) with a customer tenancy of the cloud environment.

FIG. 5A illustrates a table depicting public keys and corresponding fingerprints stored within a first storage repository of a first customer tenancy.

FIG. 5B illustrates another table depicting public keys and corresponding fingerprints stored within a second storage repository of a second customer tenancy.

FIG. 6 illustrates a table depicting public keys and corresponding fingerprints associated with a plurality of customer tenancies of a cloud environment.

FIG. 7 illustrates a key reuse report indicating key reuse across a plurality of customer tenancies of a cloud environment.

DETAILED DESCRIPTION

Figure 1:
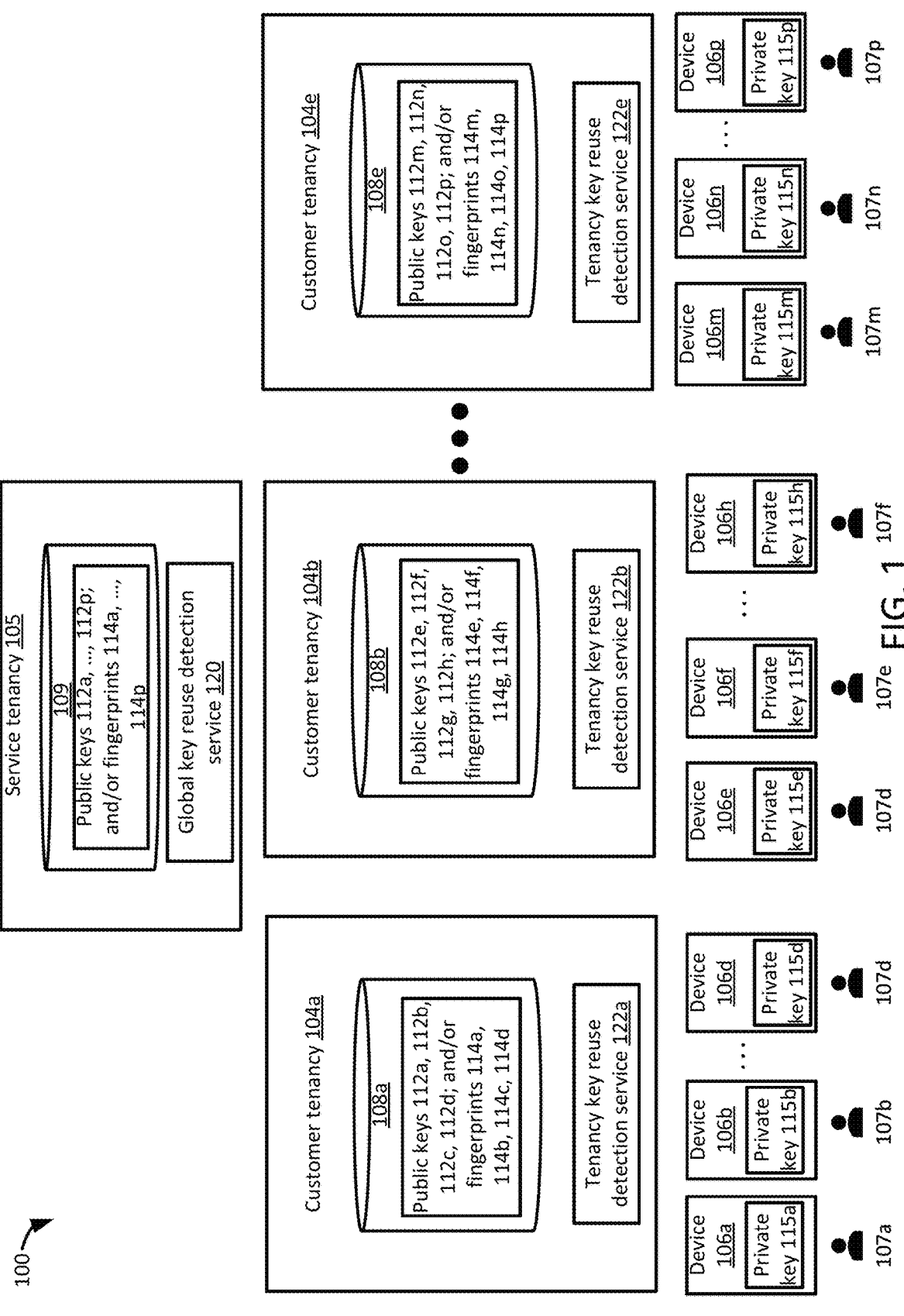
FIG. 1 illustrates a block diagram of a cloud environment that detects reuse of a cryptographic key within the cloud environment.

A cloud environment includes a plurality of tenancies rented out to a corresponding plurality of cloud customers, and such tenancies rented to respective cloud customers are also referred to as customer tenancies. Additionally, in an example, the cloud environment may also include a service tenancy. In an example, the service tenancy is owned, maintained, and/or operated by a provider of the cloud environment (or maintained and/or operated by a party or agency that provides one or more services to the cloud environment).

In the cloud environment, an end user may use a cryptographic key pair for obtaining one or more services from a customer tenancy. Such a cryptographic key pair comprises a public key and a private key pair. Examples of services provided by a customer tenancy, in which such cryptographic key pairs may be used, have been described below. Two types of cryptographic key pairs (also referred simply as key pairs) are described herein: (i) user provided public/private key pair, and (ii) system provided public/private key pair.

A user provided public/private key pair (also referred to herein as a public/private key pair provided by the user) implies that a user, using a local or cloud-based machine or otherwise, has generated or otherwise accessed the public/private key pair, and is providing a corresponding public key of the key pair to a customer tenancy of a cloud environment, e.g., to initiate a service, open a user account, or to launch a compute instance. Thus, for a public/private key pair provided by the user, the cloud environment has no control on the contents of the public/private key pair—the key pair is generated or otherwise provided by the user.

In contrast, a system provided public/private key pair (also referred to herein as a public/private key pair provided by the system) implies that the public/private key pair is generated and provided by the cloud environment or by the associated customer tenancy. The user has no control on the contents of a system provided public/private key pair.

This disclosure is directed towards reuse of user provided public/private key pairs in a cloud environment. Described below are two example use cases of usage of public keys of public/private key pairs within a cloud environment.

In a first example, a public key of a public/private key pair may be used for signing up for a user account with a customer tenancy of a cloud environment. For example, to access a cloud resource or service of a customer tenancy rented out to a cloud customer, a user may have to sign up with a public key of a private/public key pair (e.g., in addition to a user ID/password combination). The user can use a private/public key pair provided by the customer tenancy of the cloud environment (e.g., the system provided public/private key pair). Alternatively, the user can use a key pair that the user already has. For example, the user uploads a public key of a user provided private/public key pair, and then opens the user account. Later, if needed, the customer tenancy (such as a compute instance of the customer tenancy) can authenticate the user using the public key of the private/public key pair (either system provided, or user provided). Note that in addition to the usage of a public key, a user also uses the user ID/password combination when signing up with the customer tenancy of the cloud environment. In an example, a user can authenticate itself to the customer tenancy of the cloud environment using his or her user ID/password pair, and/or using the corresponding public/private key pair.

In a second example, a public key of a public/private key pair may be used for launching a compute instance within a customer tenancy. For example, when a user launches a compute instance, a public key of a public/private key pair has to be associated with the compute instance. Again, in one example, the user can use a public/private key pair provided by a customer tenancy within which the compute instance is being launched (which is a system provided public/private key pair). In another example, the user can use a public key of a public/private key pair provided by the user (e.g., a user provided public/private key pair). In such an example, the user may paste the user-provided public key in a console, during launching of the compute instance. The public/private key pair (either system provided, or user provided) used to launch the compute instance can also be used to authenticate a user with the compute instance. For example, a user possessing the public/private key pair can operate the compute instance, reconfigure the compute instance, delete the compute instance, and/or perform one or more other operations on the compute instance, as described below in further detail.

A public key (such as a user provided public key or a system provided public key) has a corresponding "fingerprint," where a fingerprint of a public key is a short sequence of bytes used to identify a relatively longer public key. In an example, a fingerprint is created by applying a cryptographic hash function to a public key, as described below in further detail. Each key pair has a corresponding unique fingerprint. The public key and/or the associated fingerprint (such as the fingerprint, and not the public key) may also be present in various logs (such as identity data plane or IDDP logs) pertaining to the user. The fingerprint within a log is an indication that the log is pertinent to the corresponding key pair, and can be mapped to a specific user who owns the key pair. Thus, activities of the user can be at least in part tracked using the fingerprint of the public key. Accordingly, instead of using the public key of a user, the corresponding fingerprint may also be used for one or more applications, as the fingerprint uniquely identifies the corresponding public key.

In an example, irrespective of whether a user-provided or a system-provided key pair is used, the public key (and the corresponding fingerprint) may be stored in a storage repository that is within the corresponding customer tenancy (or accessible from the customer tenancy), and the corresponding private key may be in the custody of the user (such as saved in the user's local or cloud-based device). Whenever the customer tenancy wants to authenticate the user for providing a service (such as changing a password, configuring or reconfiguring a user account or a compute instance, etc.), the user can be authenticated using (i) the public key maintained by the customer tenancy and (ii) the private key maintained by the user, as described below in further detail.

Thus, a cloud environment includes a plurality of customer tenancies, and each customer tenancy stores a corresponding plurality of public keys and a corresponding plurality of fingerprints. In an example, the above-described service tenancy may store public keys and/or fingerprints from a plurality of customer tenancies.

A problem may occur when the same user-provided public key is reused multiple times to obtain corresponding multiple services. The reuse of a public key may be restricted within a single customer tenancy, or may occur across multiple customer tenancies.

For example, it is probabilistically unlikely that two public keys provided by two different users will be the same, unless the two users coordinate with each other and use the same private key to generate the two public keys. Thus, a problem occurs when the same user provided public key of the same public/private key pair is reused multiple times, e.g., to sign up for one or more user accounts and/or to launch one or more compute instances within the cloud environment.

Note that such reuse of the same public key can be observed within a single customer tenancy, or across multiple customer tenancies. For example, assume that a first customer tenancy of the cloud environment is rented out to a first corporation, and a second customer tenancy of the cloud environment is rented out to a second corporation. Merely as an example, a user may (i) open a first user account with the first corporation using a first user ID, (ii) open a second user account with the first corporation using a second user ID, (iii) open a third user account with the second corporation using the first, the second, or a third user ID, and (iii) open a fourth user account with the second corporation using any of the first or the second user IDs, or a fourth user ID. Moreover, the user may reuse the same user-provided public key of a public/private key pair for all of (or at least two or more of) the above-described four user accounts. Additionally (or alternatively), the user may launch one or more compute instances within the first customer tenancy and/or launch additional one or more compute instances within the second customer tenancy, and may use the same public key of the public/private key pair to launch the various compute instances. Thus, there is a reuse of the user-provided public key of a single public/private key pair for all of (or at least two or more of) the above-described four user accounts and/or for launching of one or more of the compute instances.

In an example, a legitimate user may simply reuse the same public key multiple times for convenience, without any malicious intent. In another example, the user may reuse the same public key multiple times with malicious intent, e.g., to explore security vulnerabilities within the cloud environment. In yet another example, a malicious actor can steal a public/private key pair of a legitimate user, and open an account or launch a compute instance with the same public/private key pair.

For example, as described above, a user can be authenticated by a customer tenancy using corresponding user ID/password pair, and/or using the corresponding public/private key pair. Thus, for the above-described example in which the four different user accounts across two different customer tenancies have the same public key, a single public/private key pair can be used to control all four user accounts, although the user id/password for these accounts may (or may not) be different, resulting in possible security vulnerabilities, as described below in further detail. For example, theft of the public/private key pair can comprise all four user accounts, and/or any compute instances launched with the public/private key pair. Reuse of public keys may also possibly result in loss of non-repudiation, as described below in further detail.

In some embodiments, various techniques are disclosed herein to detect reuse of a public key and/or a corresponding fingerprint within a customer tenancy of a cloud environment, or across a plurality of customer tenancies of the cloud environment. For example, a key reuse detection service may be used to detect reuse of key pairs by querying a database, to identify a same fingerprint (or a same public key) being used multiple times, e.g., for opening user accounts and/or for launching compute instances. In an example, a first inventory system may maintain fingerprints/public keys for user accounts within a customer tenancy, and a second inventory system may maintain fingerprints/public keys for compute instances within the customer tenancy, and the query may correlate the two inventory systems.

In an example, the key reuse detection service may be maintained at a customer tenancy level, and in such an example, the key reuse detection service is also referred to as a "tenancy key reuse detection service." In another example, the key reuse detection service may be maintained at a cloud environment level (such as within the service tenancy), and in such an example, the key reuse detection service is also referred to as a "global key reuse detection service."

For example, a first cloud customer may have access to the public key/fingerprint inventory system of a first customer tenancy, and a second cloud customer may have access to the public key/fingerprint inventory system of a second customer tenancy, where a cloud customer has access to the inventory system of only its own customer tenancy, and not of any other customer tenancy. However, the cloud provider may be in a unique position and may have access to inventory systems from multiple customer tenancies. Accordingly, in an example, the cloud provider may run the queries across multiple customer tenancies associated with multiple cloud customers, e.g., to detect key reuse across multiple customer tenancies.

Thus, the above-described tenancy key reuse detection service queries public keys and/or fingerprints for a single customer tenancy, to detect key reuse within the single customer tenancy. In contrast, the above-described global key reuse detection service queries public keys and/or fingerprints for a plurality of customer tenancies (such as some or all customer tenancies within the cloud environment), to detect key reuse across multiple such customer tenancies. The global key reuse detection service may be operated from the above-described service tenancy, which may be maintained by the provider of the cloud environment (or by a third party).

In one example, the query may identify two or more different users IDs across one or more customer tenancies that are associated with the same fingerprint (or the same public key). In another example, the query may identify two or more different compute instances across one or more customer tenancies, where the two or more different compute instances are launched using the same fingerprint (or the same public key). In yet another example, the query may identify at least one user ID and at least one compute instance that are associated with the same fingerprint (or the same public key). Once such reuse of a public key is detected, a report is generated identifying such key reuse.

In an example, once a reuse of a public key is detected, correction actions may be undertaken, where such correction actions may depend on the scenario and/or on policies associated with the corresponding customer tenancies and/or the cloud environment. For example, a customer tenancy associated with a bank may have heightened security standards, and detection of a reuse of a public key in such a customer tenancy may result in a relatively severe action (e.g., forcing the user account to use a new key). On the other hand, a website having relatively lower security standards may simply choose to ignore such reuse of a public key, or may undertake relatively less severe actions.

In an example, such corrective or mitigating actions may be threshold-based. For example, if a public key is reused for at least a high threshold number of times, a higher penalty may be undertaken; and if the public key is reused for at least a low threshold number of times, a lower penalty may be undertaken. In this example, the high threshold is higher than the low threshold, and the higher penalty is more severe than the lower penalty. Example actions undertaken by customer tenancies, upon detection of a key reuse, have been described herein below in further detail.

FIG. 1 illustrates a block diagram of a cloud environment 100 that detects reuse of a cryptographic key within the cloud environment 100. The cloud environment 100 comprises a plurality of customer tenancies 104*a*, . . . , 104*e*. As described above, a customer tenancy 104 is a conceptual bucket that holds cloud resources belonging to a particular cloud customer. An administrator of a customer tenancy (such as the customer tenancy 104*a*) has administrative rights to set access policies for cloud resources in the customer tenancy 104*a*; an administrator of the customer tenancy 104*a* does not have administrative rights to set access policies for cloud resources in one or more other customer tenancies (such as customer tenancies 104*b*, . . . , 104*e*). A customer tenancy of a cloud customer is isolated from another customer tenancy of another cloud customer. Each of the customer tenancies 104*a*, . . . , 104*e* is rented out to respectively cloud customers.

Note that although a specific number of customer tenancies are illustrated in FIG. 1 and described herein, the cloud environment 100 may include any appropriate number of customer tenancies. Also, although each customer tenancy may be rented out to a corresponding cloud customer, a cloud customer may rent more than one customer tenancy in some examples. The number of customer tenancies included in the cloud environment, and a manner in which the customer tenancies are rented out to cloud customers are implementation specific, and do not limit the teachings of this disclosure. Because the customer tenancies 104*a*, . . . , 104*e* are rented out to cloud customers, in an example, each of the customer tenancies 104*a*, . . . , 104*e* are referred to herein as cloud customer tenancy, or simply as customer tenancy.

In an example, in addition to the customer tenancies 104*a*, . . . , 104*e*, the cloud environment 100 further includes a service tenancy 105. In an example, the service tenancy 105 is owned, maintained, and operated by a provider of the cloud environment 100. The service tenancy 105 is also hence referred to as cloud provider tenancy, or simply as a provider tenancy. In another example, the service tenancy 105 is maintained and operated by a party or agency that provides one or more services to the cloud environment 100.

In an example, each of a plurality of end users 107 use a corresponding plurality of devices 106 to access a corresponding customer tenancy 104. For example, users 107*a*, 107*b*, . . . , 107*d* use devices 106*a*, 106*b*, . . . , 106*d* to access cloud resources within the customer tenancy 104*a*; users 107*e*, 107*f*, . . . , 107*h* use devices 106*e*, 106*f*, . . . , 106*h* to access cloud resources within the customer tenancy 104*b*; users 107*m*, 107*n*, . . . 107*p* use devices 106*m*, 106*n*, . . . 106*p* to access cloud resources within the customer tenancy 104*e*, and so on. Although each customer tenancy 104 is illustrated in FIG. 1 to accessed by a specific number of users and a corresponding specific number of devices, the teaching of this disclosure is not limited by a number of users and/or a number of devices accessing a customer tenancy 104.

In an example, each of the customer tenancies 104*a*, . . . , 104*e* includes (or has access to) a corresponding one of storage repositories 108*a*, . . . , 108*e*. For example, customer tenancy 104*a* includes (or has access to) the storage repository 108*a*, customer tenancy 104*b* includes (or has access to) the storage repository 108*b*, customer tenancy 104*e* includes (or has access to) the storage repository 108*e*, and so on.

Each storage repository 108 stores a database including a plurality of public keys 112 and/or a plurality of fingerprints 114, where each fingerprint 114 is derived from a corresponding public key 112. For example, the storage repository 108*a* within the customer tenancy 104*a* stores a database including public keys 112*a*, 112*b*, 112*c*, 112*d*, and/or fingerprints 114*a*, 114*b*, 114*c*, 114*d*. Similarly, the storage repository 108*b* within the customer tenancy 104*b* stores a database including public keys 112*e*, 112*f*, 112*g*, 112*h*, and/or fingerprints 114*e*, 114*f*, 114*g*, 114*h*. Similarly, the storage repository 108*e* within the customer tenancy 104*e* stores a database including public keys 112*m*, 112*n*, 1120, 112*p*, and/or fingerprints 114*m*, 114*n*, 114*o*, 114*p*. Although each storage repository 108 is illustrated to store specific numbers of public keys and/or fingerprints, the teaching of this disclosure is not limited by a number of public keys and/or fingerprints stored within a storage repository, and a storage repository can store any number of public keys and/or corresponding fingerprints.

In an example, each public key 112 is a part of a public-private cryptographic key pair, where the public key 112 is stored within a storage repository 108 of a customer tenancy 104, and the corresponding private key 115 is stored within a corresponding end user device 107. For example, the public key 112*a* of a public-private cryptographic key pair is stored in the storage repository 108*a* of the customer tenancy 104*a*, whereas a corresponding private key 115*a* of the public-private cryptographic key pair is stored in the device 106*a*. Similarly, the public key 112*p* of a public-private cryptographic key pair is stored in the storage repository 108*e* of the customer tenancy 104*e*, whereas a corresponding private key 115*p* of the public-private cryptographic key pair is stored in the device 106*p*, and so on.

A public key 112 stored in a storage repository 108 and a corresponding private key 115 stored in a user device 106 form a public-private cryptographic key pair, also referred to simply as a key pair. Thus, for example, the public key 112*a* and the private key 115*a* form a corresponding key pair.

A fingerprint 114 is an attribute of a corresponding public key 112. For example, each public key 112 has a corresponding unique fingerprint 114 (e.g., public key 112*a* has a corresponding fingerprint 114*a*, public key 112*p* has a corresponding fingerprint 114*p*, and so on). A fingerprint 114 of a public key 112 is a short sequence of bytes used to identify a relatively longer public key 112. In an example, a fingerprint 114 of a public key 112 is created by applying a cryptographic hash function to the public key 112. Merely as an example, a fingerprint 114 of a public key 112 is a MD5 (message digest method 5) hexadecimal representation of the public key 112, although the fingerprint 114 can be generated using any other appropriate cryptographic technique as well.

In an example, a fingerprint 114 is a unique identifier of the corresponding public key 112. For example, a mapping between a public key 112 and its fingerprint 114 may be unique with a high probability (e.g., a given public key can have only one fingerprint, and a given fingerprint can have only one public key). When a public key 112 is uploaded (e.g., by a user, as described below) to the cloud environment 100, the corresponding fingerprint 114 may be visible. In an example, a fingerprint visibility, accessibility, or exposure from an Internet perspective may be a function of the security group configuration for a corresponding compute instance. If the server of a customer tenancy is accessible to the Internet, then the fingerprint may be assessable and available to someone who interacts with the secure shell (SSH service) on the host.

In an example, the service tenancy 105 also includes a storage repository 109, which stores a database including plurality of public keys 112 and/or corresponding fingerprints 114. In an example, the storage repository 109 of the service tenancy 105 stores the public keys 112 and/or corresponding fingerprints 114 from all or at least some of the storage repositories 108a, . . . , 108e of the customer tenancies 104a, . . . , 104e.

For example, the public keys 112a, . . . , 112d and/or the corresponding fingerprints 114a, . . . 114d stored within the storage repository 108a of the customer tenancy 104a are maintained and controlled by the cloud customer renting the customer tenancy 104a from the cloud provider. The cloud customer renting the customer tenancy 104a may provide the cloud provider authorization and access to the public keys 112a, . . . , 112d and/or the corresponding fingerprints 114a, . . . , 114d, in which case these public keys and/or the corresponding fingerprints may be stored in the storage repository 109 of the service tenancy 105 maintained by the cloud provider. Thus, the public keys and/or the corresponding fingerprints stored in a storage repository 108 of a customer tenancy may also be stored in the storage repository 109 of the service tenancy 105, if the corresponding cloud customer shares the public keys and/or the corresponding fingerprints with the service tenancy 105 maintained by the cloud customer. Thus, in an example, some or all of the public keys 112a, . . . , 112p and/or the corresponding fingerprints 114a, . . . , 114p from one or more of the customer tenancies 104a, . . . , 104e may be stored within the storage repository 109 of the service tenancy 105.

In an example, assume that a first cloud customer is renting the customer tenancy 104a and a second cloud customer is renting the customer tenancy 104b. The first cloud customer may not have any visibility of contents stored within the storage repository 108b of the customer tenancy 104b, and similarly, the second cloud customer may not have any visibility of contents stored within the storage repository 108a of the customer tenancy 104a. However, the cloud provider may be a neutral party whom both the first and second cloud customer trust, as the cloud provider is providing the cloud environment 100 to both the first and second cloud customers. Accordingly, the first and second cloud customers may share the public keys and/or the fingerprints of their respective storage repositories 108a, 108b with the storage repository 109 of the service tenancy 105 of the cloud provider. Hence, in this example, the storage repository 109 of the service tenancy 105 will store at least the public keys 112a, . . . , 112d, 112e, . . . , 112h, and the corresponding fingerprints 114a, . . . , 114d, 114e, . . . , 114h of the storage repositories 108a, 108b.

As described above, a public key 112 stored in a storage repository 108 and a corresponding private key 115 stored in a user device 106 form a public-private cryptographic key pair, also referred to simply as a key pair. FIG. 2 illustrates two example types of public-private cryptographic key pair that may be used in the cloud environment 100 of FIG. 1. For example, a first type of public-private cryptographic key pair is a "user provided" public/private key pair. Merely as an example, the public key 112a and the private key 115a, in combination, form a user provided public/private key pair. For example, in the cloud environment 100, a user 107 (such as the user 107a) can provide the public key 112a of a public/private key pair to the cloud environment 100 (example reasons behind providing the public key to the cloud environment 100 are described below). A public/private key pair "provided by the user" (or a "user provided" public/private key pair) implies that the user 107, using a local device 106 or cloud-based device or otherwise, has generated or otherwise accessed the public/private key pair, and is providing the corresponding public key to a customer tenancy of the cloud environment 100. Thus, for a user provided public/private key pair, the cloud environment 100 (or a customer tenancy of the cloud environment 100) has no control on the contents of the public/private key pair—the key pair is generated or provided by the user.

A second type of public-private cryptographic key pair is a "system provided" public/private key pair. As the name implies, a "system provided public/private key pair" or a public/private key pair "provided by the system" implies that the public/private key pair is generated and provided by the cloud environment 100 or by an associated customer tenancy 104. The end user 107 has no control on the contents of a system provided public/private key pair. Merely as an example, the public key 112p and the private key 115p, in combination, form a system provided public/private key pair. Thus, the public key 112p and the private key 115p are generated by a service of the customer tenancy 104e, and hence, the corresponding user 107p does not have any control on the contents of the public key 112p and the private key 115p.

Figure 4:
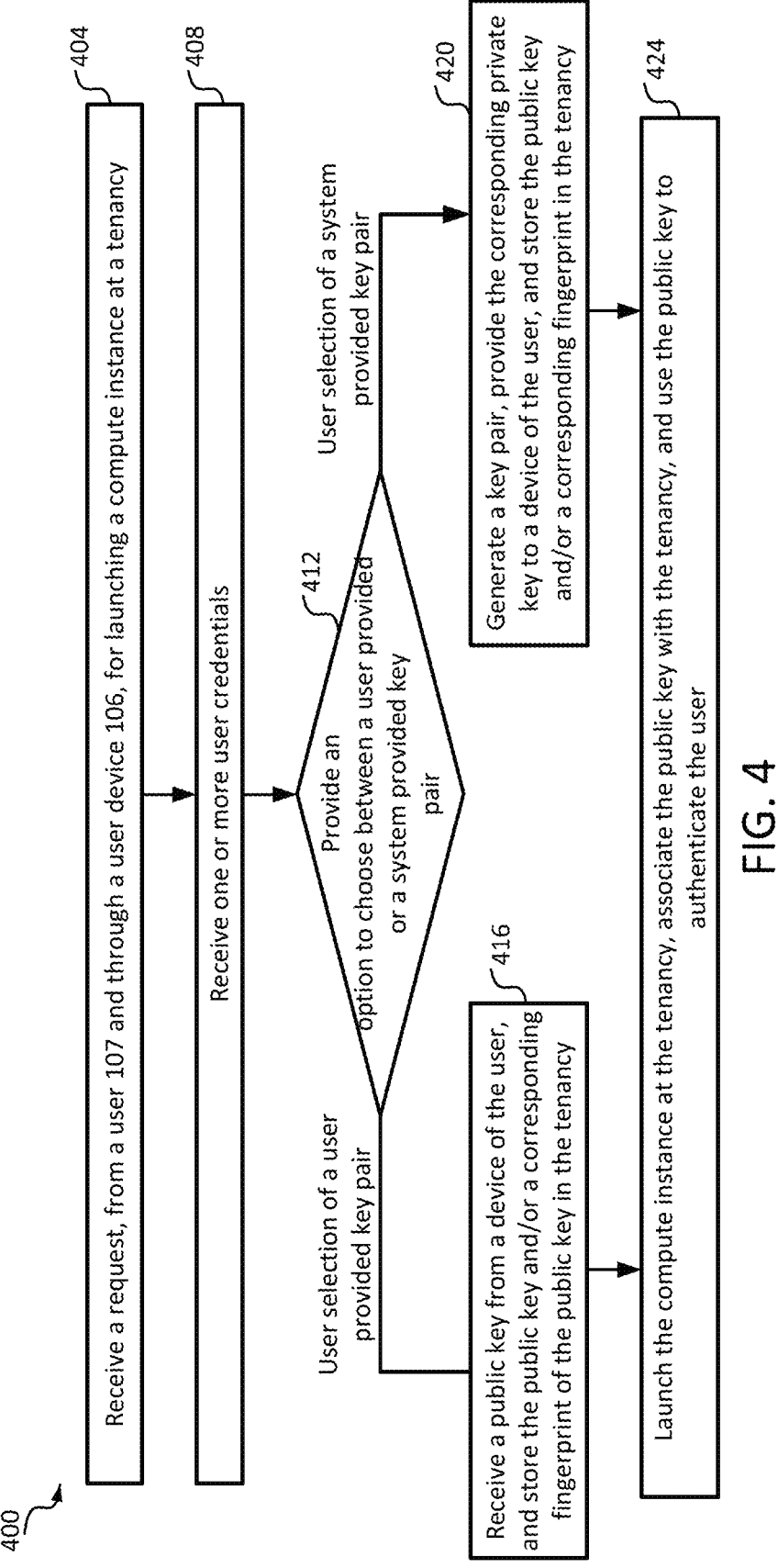
FIG. 4 illustrates a method depicting another example usage of a public/private key pair in the cloud environment of FIG. 1, where the public/private key pair may be used for launching a compute instance within a customer tenancy of the cloud environment.

As described below in further detail, this disclosure is directed towards reuse of public/private key pairs provided by the user (or user provided public/private key pair). Described below in FIGS. 3 and 4 are two example usages of public keys of public/private key pairs in the cloud environment 100.

FIG. 3 illustrates a method 300 depicting an example usage of a public/private cryptographic key pair in the cloud environment 100 of FIG. 1, where the public/private key pair may be used for signing up for a service (such as signing up for a user account) with a customer tenancy 104 of the cloud environment 100. The method 300 may be performed by any of the customer tenancies 104a, . . . , 104e of the cloud environment 100.

At 304 of the method 300, a customer tenancy 104 receives a request, from a user 107 and through a user device 106, for signing up for a service at the customer tenancy. The service may be any appropriate service offered by the customer tenancy 104. For example, if the cloud customer renting the customer tenancy 104 maintains a video streaming website, the service may be for signing up (such as creating a user account) streaming videos. In another example, if the cloud customer renting the customer tenancy 104 maintains a banking website, the service may be for signing up (such as creating a user account) for the banking website.

The method 300 proceeds from 304 to 308. At 308, the customer tenancy 104 receives one or more user credentials from the device 106 of the user 107. Examples of such user credentials include a user identification (ID), a password, a name of the user, an address of the user, an email address of the user, and/or the like.

The method 300 proceeds from 308 to 312. At 312, the customer tenancy 104 provides an option to the device 106 of the user 107 to choose between a user provided cryptographic key pair or a system provided cryptographic key pair. For example, for signing up for the service (such as creating a user account), a public key and a private key has to be selected (e.g., either by the customer tenancy 104 or by the user). The user would store and maintain the private key, and the customer tenancy 104 (such as the storage repository 108 within the customer tenancy) would maintain the corresponding public key of the cryptographic key pair. Whenever the customer tenancy 104 wants to validate the user 107 (e.g., for offering the service, or for any other purposes such as changing the user credentials such as a password), the customer tenancy 104 can use the public key/private key pair to validate the user. For example, whenever the customer tenancy 104 wants to validate the user, the device 106 of the user 107 transmits a pre-selected data that is encrypted by the private key that is in possession of the user 107. The customer tenancy 104 decrypts the encrypted data using the public key, and ensures that the decrypted data matches the pre-selected data, thereby validating that the user is in possession of the private key. A malicious actor which is not in possession of the private key may not be validated in such a way with the customer tenancy 104. In any case, at 312, the user has an option to choose a key pair provided by the customer tenancy 104 (which is a system provided key pair) or a key pair provided by the user (which is a user provided key pair).

In response to the user selecting the user provided key pair, the method 300 proceeds from 312 to 316. At 316, the customer tenancy 104 receives a public key from a device 106 of the user 107, and stores the public key in the corresponding storage repository 108. The customer tenancy 104 also generates a fingerprint of the public key (e.g., by applying a hash function to the public key), and stores the corresponding fingerprint of the public key in the in the corresponding storage repository 108 of the customer tenancy 104.

For example, assuming that the customer tenancy 104 is customer tenancy 104a and the user is user 107a, the device 106a generates or otherwise accesses a cryptographic key pair comprising the public key 112a and the corresponding private key 115a, which are considered as user provided key pair. The device 106a transmits the public key 112a to the customer tenancy 104a, and the customer tenancy 104a stores the public key 112a within the storage repository 108a. The customer tenancy 104a also generates and stores the fingerprint 114a within the storage repository 108a. Later, if and when the customer tenancy 104a has to validate the user 107a, the customer tenancy 104a may use the public key 112a to validate the user 107a.

On the other hand, in response to the user selecting the system provided key pair at 312, the method 300 proceeds from 312 to 320. At 320, the customer tenancy 104 generates a cryptographic key pair comprising a public key and a private key, provides the private key to a device of the user, and stores the public key in the corresponding storage repository 108 of the customer tenancy 104. The customer tenancy 104 also generates a corresponding fingerprint 114, and stores the fingerprint in the corresponding storage repository 108 of the customer tenancy 104.

For example, assuming that the customer tenancy 104 is customer tenancy 104e and the user is user 107p, the customer tenancy 104e generates a cryptographic key pair comprising a public key 112p and a private key 115p, provides the private key 115p to a device 106p of the user 107p, and stores the public key 112p and/or a corresponding fingerprint 114p in the customer tenancy 104e. Later, if and when the customer tenancy 104e has to validate the user 107p, the customer tenancy 104e may use the public key 112p to validate the user 107p.

The method 300 proceeds from 316 and 320 to 324. At 324, a customer tenancy 104 receives a service request from a user, and uses the public key corresponding to the user to authenticate the user, as also described above herein.

FIG. 4 illustrates a method 400 depicting another example usage of a public/private key pair in the cloud environment 100 of FIG. 1, where the public/private key pair may be used for launching a compute instance within a customer tenancy 104 of the cloud environment 100. The method 400 may be performed by any of the customer tenancies 104a, . . . , 104e of the cloud environment 100.

At 404 of the method 400, a customer tenancy 104 receives a request, from a user 107 and through a user device 106, for launching a compute instance at a customer tenancy. A compute instance is a virtual machine (VM), which is an independent computing environment that executes on physical hardware. A customer tenancy may host a plurality of such compute instances. In an example, the virtualization makes it possible to run such compute instances within a customer tenancy, where each compute instance is isolated from other compute instances within the customer tenancy.

The method 400 proceeds from 404 to 408. At 408, the customer tenancy 104 receives one or more user credentials. Examples of such user credentials include a user identification (ID), a password, a name of the user, an address of the user, an email address of the user, and/or the like.

The method 400 proceeds from 408 to 412. At 412, the customer tenancy 104 provides an option to the user (from whom the request to launch the compute instance was received) to choose between a user provided cryptographic key pair or a system provided cryptographic key pair. For example, for launching a compute instance, a public key and a private key has to be selected (e.g., either by the customer tenancy 104 or by the user). The user would store and maintain the private key, and the customer tenancy 104 (such as the storage repository 108 within the customer tenancy) would maintain the corresponding public key of the cryptographic key pair. Whenever the customer tenancy 104 wants to validate the user (e.g., for offering the service associated with the compute instance), the customer tenancy 104 can use the public key/private key pair to validate the user. For example, whenever the customer tenancy 104 wants to validate the user, the device 106 of the user 107 transmits a pre-selected data that is encrypted by the private key that is in possession of the user 107. The compute instance and/or the customer tenancy 104 decrypts the encrypted data using the public key, and ensures that the decrypted data matches the pre-selected data, thereby validating that the user is in possession of the private key. A malicious actor which is not in possession of the private key may not be validated in such a way with the customer tenancy 104. In any case, at 412, the user has an option to choose a key pair provided by the customer tenancy 104 (which is a system provided key pair) or a key pair provided by the user (which is a user provided key pair).

In response to the user selecting the user provided key pair, the method 400 proceeds from 412 to 416. At 416, the customer tenancy 104 receives a public key from a device 106 of the user 107, stores the public key in the customer tenancy 104, generates a corresponding fingerprint of the public key, and also stores the in the customer tenancy 104 (e.g., similar to the process 316 of the method 300).

On the other hand. in response to the user selecting the system provided key pair, the method 400 proceeds from 412 to 420. At 420, the customer tenancy 104 generates a cryptographic key pair comprising a public key and a private key, provides the private key to a device of the user, and stores the public key and/or a corresponding fingerprint in the customer tenancy 104 (e.g., similar to the process 320 of the method 300).

The method 400 proceeds from 416 and 420 to 424. At 424, the compute instance is launched at the customer tenancy 104, and the public key is associated with the compute instance. Whenever the user is to be validated by the customer tenancy 104 and/or the launched compute instance (e.g., to provide a service associated with the compute instance, such as configure the compute instance), and the public key and the private key may be used to authenticate the user, e.g., as also described above.

FIG. 5A illustrates a table 500*a* depicting public keys and corresponding fingerprints stored within a first storage repository 108*a* of a first customer tenancy 104*a*, and FIG. 5B illustrates a table 500*b* depicting public keys and corresponding fingerprints stored within a second storage repository 108*b* of a second customer tenancy 104*b*.

The table 500*a* includes a first column for IDs of public keys stored within the storage repository 108*a* of the customer tenancy 104*a*, a second column for contents of the public keys, a third column for IDs of corresponding fingerprints stored within the storage repository 108*a* of the customer tenancy 104*a*, a fourth column for contents of the fingerprints, a fifth column for storing the ID of the customer tenancy 104*a*, and a sixth column for storing a type of individual public keys (e.g., whether the public key is user provided or system provided). Note that the IDs of the public keys and fingerprints, as illustrated in FIG. 5A, are mere labels of the public keys and the fingerprints, respectively, used in FIG. 1. In practical implementations, these IDs are likely to be binary or hexadecimal numbers. Similarly, contents of the public keys and the fingerprints are oversimplified in FIG. 5A, so as to not obfuscate the teachings of this disclosure. Various columns of the table 500*b* of FIG. 5B will also be evident, based on the above description with respect to the table 500*a* of FIG. 5A.

Referring to FIG. 5A, four public keys 112*a*, . . . , 112*d* are illustrated, along with the corresponding contents of the public keys, the corresponding fingerprint IDs, and the corresponding contents of the fingerprints. Note that all the public keys 112*a*, . . . , 112*d* are for the customer tenancy 104*a*. As illustrated, the public keys 112*a*, 112*c*, 112*d* have the same content. Thus, the same public key is reused for three occasions as public keys 112*a*, 112*c*, 112*d*. Merely as an example, the public key 112*a* may be used to sign up for a first user account, the public key 112*c* may be used to sign up for a second user account, and the public key 112*d* may be used to launch a compute instance.

In an example, a first inventory system may maintain fingerprints and/or public keys used for opening user accounts within a customer tenancy (such as the customer tenancy 104*a*), and a second inventory system may maintain fingerprints and/or public keys used for launching compute instances within the customer tenancy. In an example, a query correlates the two inventory systems, to generate the table 500*a* and/or to detect key reuse in the customer tenancy.

Referring to FIG. 5B, four public keys 112*e*, . . . , 112*h* are illustrated, along with the corresponding contents of the public keys, the corresponding fingerprint IDs, and the corresponding contents of the fingerprints. Note that all the public keys 112*e*, . . . , 112*h* are for the customer tenancy 104*e*. As illustrated, the public keys 112*e*, 112*h* have the same content. Example usages of the public keys 112*e*, . . . , 112*h* are also illustrated in FIG. 5B.

Referring again to FIG. 1, in an example, individual customer tenancies 104 include a corresponding tenancy key reuse detection service 122. For example, the customer tenancy 104*a* includes a tenancy key reuse detection service 122*a*, the customer tenancy 104*b* includes a tenancy key reuse detection service 122*b*, the customer tenancy 104*e* includes a tenancy key reuse detection service 122*e*, and so on.

A tenancy key reuse detection service 122 of a customer tenancy detects whether a public key, or an attribute thereof (such as a corresponding fingerprint) has been reused within the customer tenancy for more than once. For example, referring to FIGS. 1 and 5A, the tenancy key reuse detection service 122*a* of the customer tenancy 104 may generate, maintain, and/or access the table 500*a*. Thus, the tenancy key reuse detection service 122*a* of the customer tenancy 104 detects that the same public key is reused for three occasions as public keys 112*a*, 112*c*, 112*d*.

On the other hand, for the customer tenancy 104*b*, the public keys 112*e*, 112*h* have the same content, and hence, the tenancy key reuse detection service 122*b* of the customer tenancy 104*b* detects reuse of the same public key as the public keys 112*e*, 112*h*.

Furthermore, note that the public key 112*g* of the customer tenancy 104*b* is same as the public key 112*b* of the customer tenancy 104*a*. However, none of the tenancy key reuse detection services 122*a*, 122*b* can detect such a reuse of a public key across more than one customer tenancy, as each tenancy key reuse detection service 122 performs the detection across a single corresponding customer tenancy.

A problem may occur when the same public key is reused multiple times to obtain corresponding multiple services (such as signing up of users and/or launching of compute instances). It may be probabilistically unlikely that two or more system provided public keys (or one or more system provided public keys and one or more user provided public keys) match and are reused, because the system provided public keys may be generated randomly or at least pseudo randomly by a customer tenancy. Accordingly, as illustrated in FIGS. 5A and 5B, two or more public keys may match if the two or more public keys are user provided public keys.

Furthermore, it may be probabilistically likely that two (or more) user provided public keys do not match, unless the two (or more) user provided public keys are generated in coordination with each other, or are simply reused. Thus, a problem occurs when the same user provided public key of the same public/private key pair is reused multiple times, e.g., to sign up for one or more user accounts and/or to launch one or more compute instances within the cloud environment.

Note that in an example, such reuse of the same public key may be within a single customer tenancy (e.g., reuse of content of public keys 112*a*, 112*c*, 112*d* within customer tenancy 104*a*, or reuse of content of public keys 112*e*, 112*h* within customer tenancy 104*b*). In an example, such reuse of the same public key may be across two or more customer tenancies (e.g., reuse as public key 112*b* within customer tenancy 104*a* and also as public key 112*g* with the customer tenancy 104*b*).

Reuse of a public key more than once may lead to vulnerabilities within the cloud environment 100. Merely as an example, assume that a first customer tenancy (such as customer tenancy 104*a*) of the cloud environment 100 is rented out to a first corporation, and a second customer tenancy (such as customer tenancy 104*b*) of the cloud environment 100 is rented out to a second corporation. Also merely as an example, a user may (i) open a first user account with the first corporation using a first user ID, (ii) open a second user account with the first corporation using a second user ID, (iii) open a third user account with the second corporation using the first, the second, or a third user ID, and (iii) open a fourth user account with the second corporation using any of the first or the second user IDs, or a fourth user ID. Moreover, the user may reuse the same user-provided public key of a public/private key pair for all of (or at least two or more of) the above-described four user accounts. Additionally (or alternatively), the user may launch one or more compute instances within the first customer tenancy and/or launch additional one or more compute instances within the second customer tenancy, and may use the same public key of the public/private key pair to launch the various compute instances, in an example.

Note that the same user need not open the above-described four accounts and/or launch the above-described compute instances-instead, different users can perform these tasks. The main issue here is the reuse of the user-provided public key of a single public/private key pair for all of (or at least two or more of) the above-described four user accounts and/or for launching of one or more of the compute instances. Thus, there is a reuse of the same public key to obtain different services, which may occur within a single customer tenancy of the cloud environment, or across multiple customer tenancies of the cloud environment.

In an example, a legitimate user may simply reuse the same public key multiple times for convenience, e.g., in order to save time and/or resources in generating and/or maintaining public/private key pairs, without any malicious intent. In another example, the user may reuse the same public key multiple times with malicious intent, e.g., to explore security vulnerabilities within the cloud environment 100. In yet another example, a malicious actor can steal a public/private key pair of a legitimate user, and open one or more user accounts and/or launch one or more compute instances with the same public/private key pair.

For example, a user can be authenticated by a customer tenancy using corresponding user ID/password pair, and/or using the corresponding public/private key pair. Thus, for the above-described example in which the four different user accounts across two different customer tenancies have the same public key, a single public/private key pair can be used to control all four user accounts, although the user id/password for these accounts may (or may not) be different. The same public/private key pair can be used as one factor to access the four different user accounts across two different customer tenancies. Thus, the same public/private key pair can be used to access different user accounts with possibly different privileges, resulting in possible security vulnerabilities. For example, theft of the public/private key pair can comprise all four user accounts, and/or any compute instances launched using the public/private key pair.

Reuse of public keys may also possibly result in loss of non-repudiation. For example, an action taken from the first user account of these four user accounts cannot be uniquely attributed to a user of the first user account, as other user IDs of the three other user accounts also had access to the same first user account via the same public/private key pair. This may lead to security vulnerabilities. For example, a user may maliciously copy a public/private key pair of another user, and use the public/private key pair to control a user account of the other user.

As described above, to detect reuse of a public key, individual customer tenancies 104 include the tenancy key reuse detection services 122, each of which can detect reuse of a public key within the customer tenancy. For example, the tenancy key reuse detection service 122a may compare the public keys 112a, . . . , 112d within the storage repository 108a, and/or may compare an attribute of the public keys 112a, . . . , 112d (such as the fingerprints 114a, . . . , 114d) within the storage repository 108a. For example, the tenancy key reuse detection service 122a queries a database within the storage repository 108a (such as the table 500), and determines a number of times a first public key (such as the public key 112a) or a first attribute corresponding to the first public key (such as the fingerprint 114a) occurs within the database (such as the table 500a). The tenancy key reuse detection services 122a determines that the number of times is equal to or greater than a threshold number. In an example, the threshold number is a positive integer, such as one or greater than one, as described below in further detail. In response to a determination that the number of times is equal to or greater than the threshold number, the tenancy key reuse detection services 122a tags the first public key as being reused for at least the threshold number of times. Thus, the tenancy key reuse detection services 122a tags the public keys 112a, 112c, 112d as being the same public key, and as being reused for three times within the customer tenancy 104a. The tenancy key reuse detection services 122a also outputs a report indicating reuse of the public keys (or the associated fingerprints) within the customer tenancy 104a.

Similarly, the tenancy key reuse detection services 122b tags the public keys 112e, 112h as being the same public key, and as being reused for two times within the customer tenancy 104a, as illustrated in table 500b of FIG. 5B.

Each such reused public key may be used for creating or maintaining a corresponding user account within a customer tenancy, or may be used to launch corresponding compute instance within a customer tenancy.

However, although a tenancy key reuse detection service 122 can detect reuse of a public key and/or a corresponding fingerprint within a corresponding customer tenancy, a tenancy key reuse detection service 122 cannot detect reuse of a public key and/or a corresponding fingerprint across multiple customer tenancies. Accordingly, the service tenancy 105 includes a global key reuse detection service 120 that can detect key reuse across multiple customer tenancies.

In an example, the global key reuse detection service 120 can run a query within the storage repository 109 that stores public keys 112a, . . . , 112p and/or fingerprints 114a, . . . , 114p across multiple customer tenancies, to detect key reuse across multiple customer tenancies. Alternatively, or additionally, the global key reuse detection service 120 can run a joint query among multiple storage repositories, such as storage repositories 108a, . . . , 108e, to detect key reuse across multiple customer tenancies.

FIG. 6 illustrates a table 600 depicting public keys and corresponding fingerprints associated with a plurality of customer tenancies 104a, . . . , 104e of the cloud environment 100. In an example, the table 600 is generated by the global key reuse detection service 120, e.g., by querying a database stored within the storage repository 109 of the service tenancy 105. Alternatively (or additionally), the table 600 is generated by the global key reuse detection service 120, e.g., based on a joint query of databases within the plurality of storage repositories 108a, . . . 108e of the plurality of customer tenancies 104a, . . . , 104e.

The table 600 has columns that are at least in part similar to the columns of the tables 500a, 500b described above. The table 600 will be evident, based on the above description of the tables 500a and 500b of FIGS. 5A and 5B above.

As illustrated in the table 600, a public key 112a is also reused as the public keys 112c, 112d of the customer tenancy 104a and also as the public key 112m of the customer tenancy 104e. Similarly, a public key 112e is also reused as the public key 112h of the customer tenancy 104b and also as the public key 1120 of the customer tenancy 104e. Furthermore, a public key 112b is also reused as the public key 112g of the customer tenancy 104b.

Thus, the table 600 provides indication of key reuse across multiple customer tenancies. The global key reuse detection service 120 generates, maintains, and/or accesses the table 600, and generates a report indicating key reuse across multiple customer tenancies. FIG. 7 illustrates a key reuse report 700 (also referred to herein as report 700) indicating key reuse across a plurality of customer tenancies 104a, . . . , 104e of the cloud environment 100. The report 700 may be generated by the global key reuse detection service 120, based on accessing and querying the table 600.

In the example of FIGS. 6 and 7, the public key 112a is reused 4 times, e.g., as public keys 112a, 112c, 112d, and 112m, and across customer tenancies 104a and 104e. Similarly, the public key 112e is reused 3 times, e.g., as public keys 112e, 112h, and 1120, and across customer tenancies 104b and 104e. Similarly, the public key 112b is reused 2 times, e.g., as public keys 112b and 112g, and across customer tenancies 104a and 104b.

Note that to detect a reuse of a public key, the global key reuse detection service 120 and/or the tenancy key reuse detection service 122e may compare each public key with other public keys. Additionally, or alternatively, to detect a reuse of a public key, the global key reuse detection service 120 and/or the tenancy key reuse detection service 122e may also compare each fingerprint with other fingerprints, e.g., due to the unique relationship between a fingerprint and a public key.

Furthermore, a reuse of a public key also implies that the corresponding private key is also being reused. For example, as the public keys 112a, 112c, 112d, 112m are the same (see FIGS. 6 and 7), the corresponding fingerprints 114a, 114c, 114d, 114m are also the same, and furthermore, the corresponding private keys 115a, 115c, 115d, 115m are also the same. Thus, a reuse of a public key also implies a reuse of a corresponding fingerprint, and also implies a reuse of a corresponding private key, and furthermore implies a reuse of a corresponding public/private cryptographic key pair.

Furthermore, a public key that is being reused may be used for obtaining a service from a customer tenancy 104 (such as signing up for a user account) and/or may be used for launching a compute instance within a customer tenancy 104, as also described with respect to FIGS. 5A and 5B. For example, referring to FIGS. 5A and 7, the public key 112a is reused 4 times, e.g., as public keys 112a, 112c, 112d, and 112m, and across customer tenancies 104a and 104e, where (i) the public key 112a is used for signing up for a first user account at the customer tenancy 104a, (ii) the public key 112c is used for signing up for a second user account at the customer tenancy 104a, (iii) the public key 112d is used for launching a first compute instance at the customer tenancy 104a, and (iv) the public key 112m may be used for signing up for a third user account or for launching a second compute instance at the customer tenancy 104e.

Note that as described above, each tenancy key reuse detection service 122 is used for detection of reuse of public keys within a corresponding single customer tenancy 104, whereas the global key reuse detection service 120 is used for detection of reuse of public keys within a plurality of customer tenancies 104a, . . . , 104e. This is because each tenancy key reuse detection service 122 has access to public keys and/or the corresponding fingerprints stored within the corresponding storage repository 108 of the corresponding customer tenancy, and may not have access to public keys and/or the corresponding fingerprints stored within other customer tenancies. For example, the customer tenancy 104a may be rented to a first cloud customer and the customer tenancy 104c may be rented to a second cloud customer, and the tenancy key reuse detection service 122a may access public keys and/or fingerprints stored in storage repositories of customer tenancy (or customer tenancies)

rented to the first cloud customer only, such as the storage repository 108a of the customer tenancy 104a.

However, in an example, a cloud customer may rent multiple customer tenancies from the cloud provider. Merely as an example, a financial institution may rent out (i) a first customer tenancy 104a for providing banking service, (ii) a second customer tenancy 104b for providing credit card service, and (iii) a third customer tenancy 104e for providing brokerage service. In such an example, the tenancy key reuse detection service 122a may be authorized to have access to the storage repositories 108a, 108b, 108c of the customer tenancies 104a, 104b, 104e. Accordingly, the tenancy key reuse detection service 122a may now detect public key reuse across multiple customer tenancies, such as across customer tenancies 104a, 104b, 104e.

Corrective Actions, Based on Key Reuse Detection

Once a reuse of a public key is detected, correction actions may be undertaken, where such correction actions may depend on the scenario and/or on policies associated with the corresponding customer tenancies 104 and/or the cloud environment 100. For example, a user using the same user provided public/private key pair for multiple user accounts in two different customer tenancies (or for multiple user accounts in the same customer tenancy) is not necessarily malicious. For example, the user may do so as a convenience, as the user has to maintain a single public/private key pair across all such user accounts and/or compute instances. However, if the single public/private key pair is stolen, all such accounts and compute instances associated with the single public/private key pair become susceptible to hacking. This is akin to using the same user ID/password for multiple different websites, and theft of the user ID/password risks all such accounts across the different websites.

As described above, corrective actions may be based on policies associated with the customer tenancies. For example, a customer tenancy associated with a bank may have heightened security standards, and detection of a reuse of a public key in such a customer tenancy may result in one or more of (i) forcing the user account to use a new key, (ii) informing the user that a new public key should be used, (iii) suspending user authentication process that uses any reused public key, (iv) temporarily banning a user from accessing the user account, until a new public key is uploaded, and/or the like. Similarly, if a user tries to use a public key to open a user account or lunch a compute instance, where the public key has previously been tagged as being reused for at least a threshold number of time (or where the public key has been in use within the customer tenancy or the cloud environment 100), the request for creating the user account or launching the compute instance may be rejected. The user may be requested to use a different public key, or use a system provided public key.

In another example, a website having relatively lower security standards may simply choose to ignore such reuse of a public key, or may simply inform the user that usage of a unique public key is advisable. Thus, mitigation of reuse of public keys and correction actions may depend on security standards and policies of individual customer tenancies.

In another example, if a public key is reused for at least for a threshold number of times and/or across at least a threshold number of customer tenancies, the public key may be tagged (e.g., by a tenancy key reuse detection service 122 and/or the global key reuse detection service 120) as being used for at least for the threshold number of times and/or across at least the threshold number of customer tenancies. A more severe correction action may be taken (such as suspending usage of the public key across the cloud environment) against users of the public keys that are tagged in such a manner. The corrective actions taken may be implementation specific. Thus, any widespread fraud using the same key is considered abuse, and corresponding corrective action is undertaken. Merely as an example, there may be a policy within the cloud environment 100 (or within one or more customer tenancies 104 within the cloud environment 100) that if a public key is reused for at least 3 times, corrective actions are to be undertaken. Referring to FIG. 7, in such an example, because the public key 112*b* is used merely twice, no corrective actions may be undertaken. However, because the public key 112*a* is used 4 times, such reusage of the public key 112*a* may be penalized. Similarly, because the public key 112*e* is used thrice, such reusage of the public key 112*a* may also be penalized. As described above, the penalty of using the public key for at least the threshold number of times may be implementation specific. In an example, the threshold number may be set at a relatively high number, such as 50 or 100 merely as an example, so as to prevent any widespread fraud, and yet not penalize legitimate users reusing public keys for convenience.

In another example, different threshold numbers may be used for different types of corrective actions. For example, if a public key is reused for at least a high threshold number of times, a higher penalty may be undertaken; and if the public key is reused for at least a low threshold number of times, a lower penalty may be undertaken. In this example, the high threshold is higher than the low threshold, and the higher penalty is more severe than the lower penalty. Merely as an example, the lower penalty may be to simply advise or warn the user about reuse of public keys. Merely also as an example, the higher penalty may be to reject the public key to further open new user accounts and/or launch new compute instances, temporarily deactivate or delete user accounts and/or compute instances associated with the public key, and/or another appropriate severe penalty that is higher than the lower penalty.

In an example, public keys may legitimately be shared across software developers, e.g., within a laboratory or testing tenancy, and/or a service tenancy of the cloud provider. In such cases, the developers may be allowed to continue reusing the same public keys for multiple user accounts and/or for launching of multiple compute instances, and/or may be warned about the same.

In an example, probabilistic risked based modelling can be employed to differentiate between malicious scenarios versus a genuine use case where a legitimate user reuses the same keys for user account(s) and/or compute instance(s) across one or more customer tenancies. Similarly, in an example, Artificial Intelligence (AI) models may also be deployed, which are trained on past patterns of malicious and legitimate reuse of public keys. If estimated by such probabilistic and/or AI models to be malicious, the reuse of the public keys can be prohibited or at least investigated more thoroughly, and corrective actions may be undertaken, where such corrective actions may be implementation specific, as described above.

Methodologies

Figure 8:
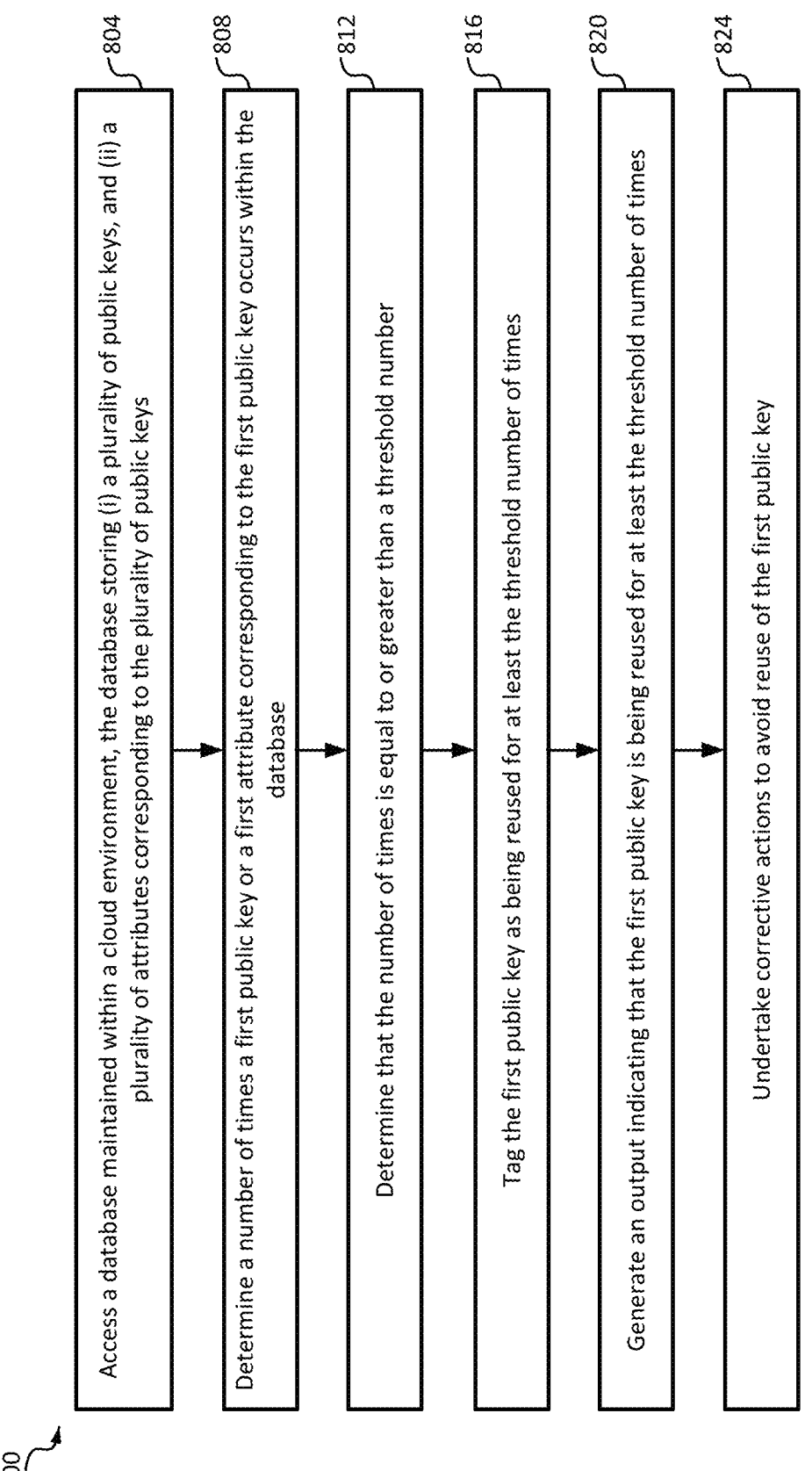
FIG. 8 illustrates a method for detecting and/or avoiding key reuse in a cloud environment.

FIG. 8 illustrates a method 800 for detecting and/or avoiding key reuse in a cloud environment. The method 800 may be performed in the cloud environment 100 of FIG. 1 described above.

The method 800 includes, at 804, accessing a database maintained within a cloud environment, where the database stores (i) a plurality of public keys, and (ii) a plurality of attributes (such as fingerprints) corresponding to the plurality of public keys. In an example, each public key is associated with either (i) a corresponding user account of a corresponding customer tenancy of the cloud environment or (ii) a compute instance hosted within a corresponding customer tenancy of the cloud environment, as described above.

In one example, the database may be for a single customer tenancy (or one or more customer tenancies), such as the database within the storage repository 108*a* storing public keys and fingerprints for the customer tenancy 104*a*, and the database may be accessed by the tenancy key reuse detection service 122*a*.

In another example, the database may be for a plurality of customer tenancies of the cloud environment 100, such as the database within the storage repository 109 storing public keys and fingerprints for a plurality of customer tenancies 104*a*, . . . , 104*e*, and the database may be accessed by the global key reuse detection service 120.

In yet another example, the database may be a combination of a plurality of databases within the plurality of storage repositories 108*a*, . . . , 108*e*, where the global key reuse detection service 120 does a joint query on such a combination of databases.

The method proceeds from 804 to 808. At 808, a determination is made as to a number of times a first public key or a first attribute corresponding to the first public key occurs within the database. For example, the global key reuse detection service 120 (or the tenancy key reuse detection service 122*a*) determines a number of times a public key 112*a* or a first attribute corresponding to the public key 112*a* (such as the fingerprint 114*a*) occurs within the database.

The method proceeds from 808 to 812. At 812, it is determined that the number of times is equal to or greater than a threshold number, where the threshold number has been described above.

The method proceeds from 812 to 816. At 816, the first public key is tagged as being reused for at least the threshold number of times, e.g., by the global key reuse detection service 120 (or the tenancy key reuse detection service 122*a*).

The method proceeds from 816 to 820. At 820, an output is generated (such as the report 700 of FIG. 7) indicating that the first public key is being reused for at least the threshold number of times.

The method proceeds from 820 to 824. At 824, corrective actions are undertaken to avoid reuse of the first public key. Examples of such corrective actions are described above.

Computer System Architecture

Figure 9:
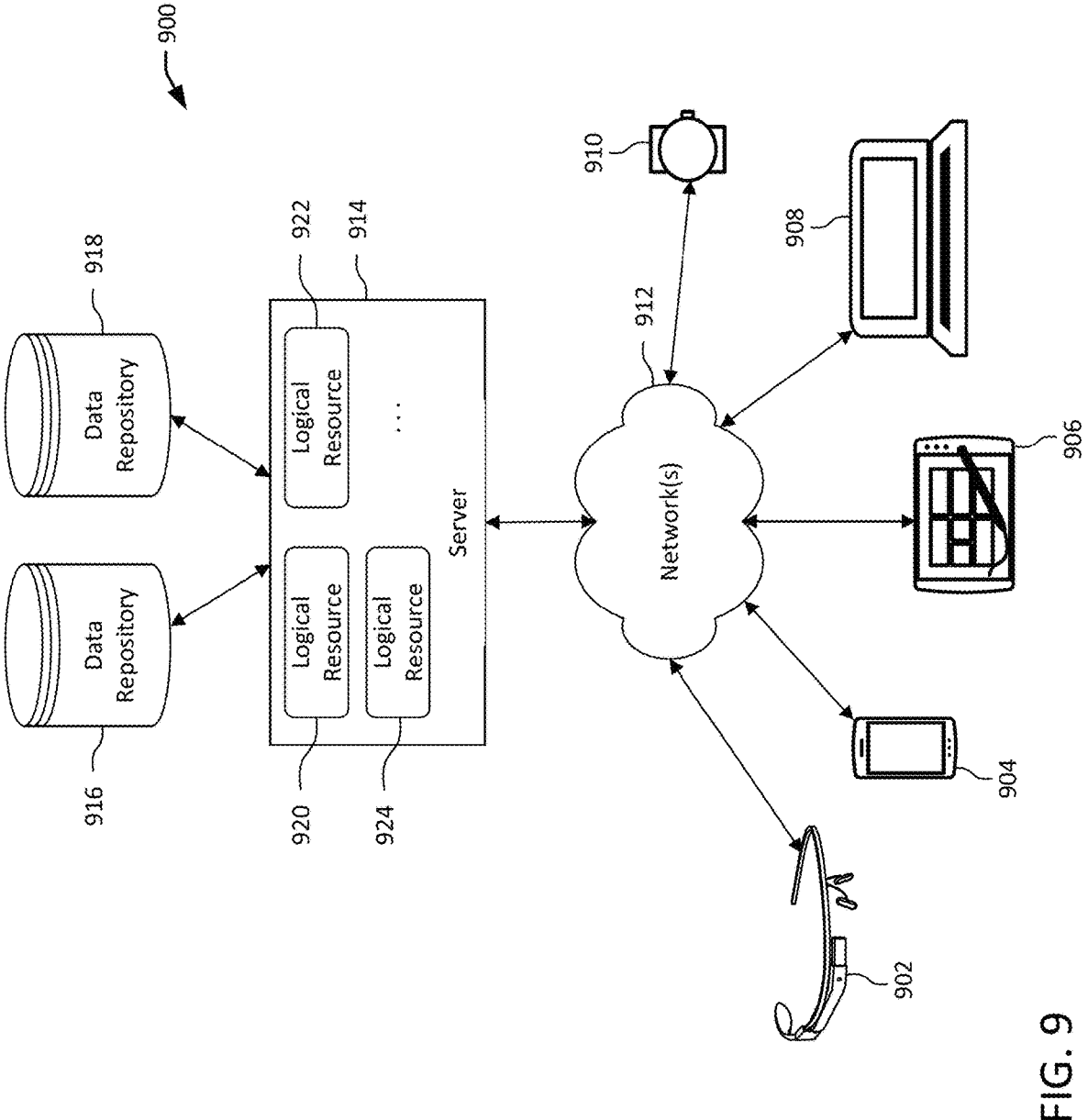
FIG. 9 depicts a simplified diagram of a distributed system for implementing certain aspects.

FIG. 9 depicts a simplified diagram of a distributed system 900 for implementing an embodiment. In the illustrated embodiment, distributed system 900 includes one or more client computing devices 902, 904, 906, 908, and/or 910 coupled to a server 914 via one or more communication networks 912. Clients computing devices 902, 904, 906, 908, and/or 910 may be configured to execute one or more applications.

In various aspects, server 914 may be adapted to run one or more services or software applications that enable techniques for detecting key reuse in a cloud environment, and/or taking corrective actions.

In certain aspects, server 914 may also provide other services or software applications that can include non-virtual and virtual environments. In some aspects, these services may be offered as web-based or cloud services, such as under a Software as a Service (SaaS) model to the users of client computing devices 902, 904, 906, 908, and/or 910. Users operating client computing devices 902, 904, 906,

908, and/or 910 may in turn utilize one or more client applications to interact with server 914 to utilize the services provided by these components.

In the configuration depicted in FIG. 9, server 914 may include one or more components 920, 922 and 924 that implement the functions performed by server 914. These components may include software components that may be executed by one or more processors, hardware components, or combinations thereof. It should be appreciated that various different system configurations are possible, which may be different from distributed system 900. The embodiment shown in FIG. 9 is thus one example of a distributed system for implementing an embodiment system and is not intended to be limiting.

Users may use client computing devices 902, 904, 906, 908, and/or 910 for techniques for detecting key reuse in a cloud environment, and/or taking corrective actions in accordance with the teachings of this disclosure. A client device may provide an interface that enables a user of the client device to interact with the client device. The client device may also output information to the user via this interface. Although FIG. 9 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 912 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 912 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 914 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 914 can include one or more virtual machines running virtual operating systems, or other computing architectures involving virtualization such as one or more flexible pools of logical storage devices that can be virtualized to maintain virtual storage devices for the server. In various aspects, server 914 may be adapted to run one or more services or software applications that provide the functionality described in the foregoing disclosure.

The computing systems in server 914 may run one or more operating systems including any of those discussed above, as well as any commercially available server operating system. Server 914 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 914 may include one or more applications to analyze and consolidate data feeds and/or event updates received from users of client computing devices 902, 904, 906, 908, and/or 910. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 914 may also include one or more applications to display the data feeds and/or real-time events via one or more display devices of client computing devices 902, 904, 906, 908, and/or 910.

Distributed system 900 may also include one or more data repositories 916, 918. These data repositories may be used to store data and other information in certain aspects. For example, one or more of the data repositories 916, 918 may be used to store information for techniques for detecting key reuse in a cloud environment, and/or taking corrective actions. Data repositories 916, 918 may reside in a variety of locations. For example, a data repository used by server 914 may be local to server 914 or may be remote from server 914 and in communication with server 914 via a network-based or dedicated connection. Data repositories 916, 918 may be of different types. In certain aspects, a data repository used by server 914 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 916, 918 may also be used by applications to store application data. The data repositories used by applications may be of different types such as, for example, a key-value store repository, an object store repository, or a general storage repository supported by a file system.

In one embodiment, server 914 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 10:
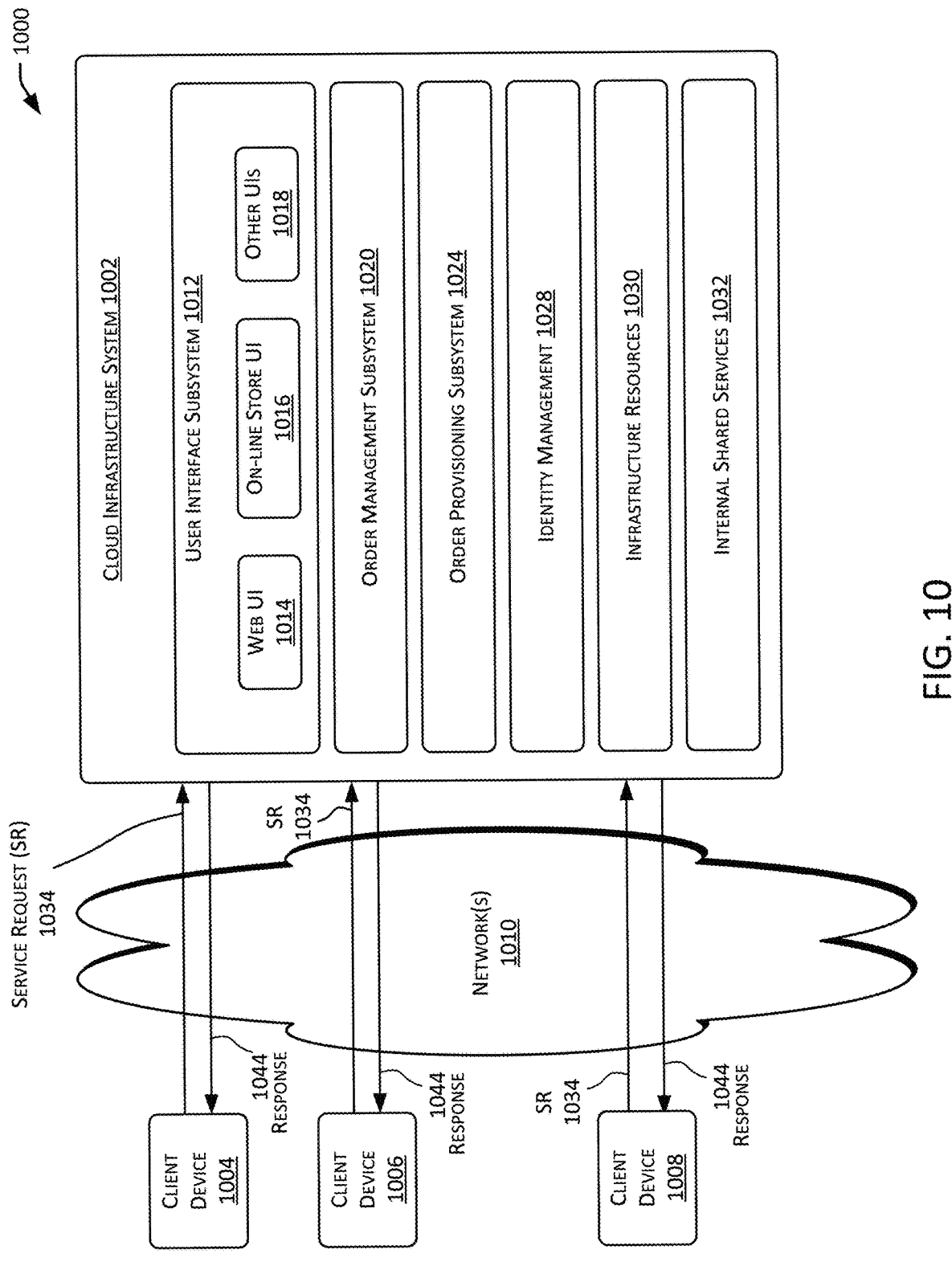
FIG. 10 is a simplified block diagram of one or more components of a system environment by which services provided by one or more components of an embodiment system may be offered as cloud services, in accordance with certain aspects.

FIG. 10 is a simplified block diagram of a cloud-based system environment for detecting key reuse in a cloud environment, and/or taking corrective actions, in accordance with certain aspects. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and cloud infrastructure system 1002. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some other aspects, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative aspects.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 1010 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 1002 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 1002 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 1002. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 1002. Cloud infrastructure system 1002 then performs processing to provide the services requested in the tenant's subscription order. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third party cloud services provider and the cloud services are offered to any general public tenant, where the tenant can be an individual or an enterprise. In certain other aspects, under a private cloud model, cloud infrastructure system 1002 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as devices 902, 904, 906, and 908 depicted in FIG. 9) and may be capable of operating one or more client applications. A user may use a client device to interact with cloud infrastructure system 1002, such as to request a service provided by cloud infrastructure system 1002.

In some aspects, the processing performed by cloud infrastructure system 1002 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1002 for determining the intent of an utterance. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like.

In certain aspects, to facilitate efficient provisioning of these resources for supporting the various cloud services provided by cloud infrastructure system 1002 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a consumer, and other interfaces 1018. For example, a tenant may, using a client device, request (service request 1034) one or more services provided by cloud infrastructure system 1002 using one or more of interfaces 1014, 1016, and 1018. For example, a tenant may access the online store, browse cloud services offered by cloud infrastructure system 1002, and place a subscription order for one or more services offered by cloud infrastructure system 1002 that the tenant wishes to subscribe to. The service request may include information identifying the tenant and one or more services that the tenant desires to subscribe to.

In certain aspects, such as the embodiment depicted in FIG. 10, cloud infrastructure system 1002 may comprise an order management subsystem (OMS) 1020 that is configured to process the new order. As part of this processing, OMS 1020 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 1020 may then invoke the order provisioning subsystem (OPS) 1024 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 1002 may send a response or notification 1044 to the requesting tenant to indicate when the requested service is now ready for use. In some instances, information (e.g., a link) may be sent to the tenant that enables the tenant to start using and availing the benefits of the requested services.

Cloud infrastructure system 1002 may provide services to multiple tenants. For each tenant, cloud infrastructure system 1002 is responsible for managing information related to one or more subscription orders received from the tenant, maintaining tenant data related to the orders, and providing the requested services to the tenant or clients of the tenant. Cloud infrastructure system 1002 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 1002 may provide services to multiple tenants in parallel. Cloud infrastructure system 1002 may store information for these tenants, including possibly proprietary information. In certain aspects, cloud infrastructure system 1002 comprises an identity management subsystem (IMS) 1028 that is configured to manage tenant's information and provide the separation of the managed information such that information related to one tenant is not accessible by another tenant. IMS 1028 may be configured to provide various security-related services such as identity services, such as information access management, authentication and authorization services, services for managing tenant identities and roles and related capabilities, and the like.

Figure 11:
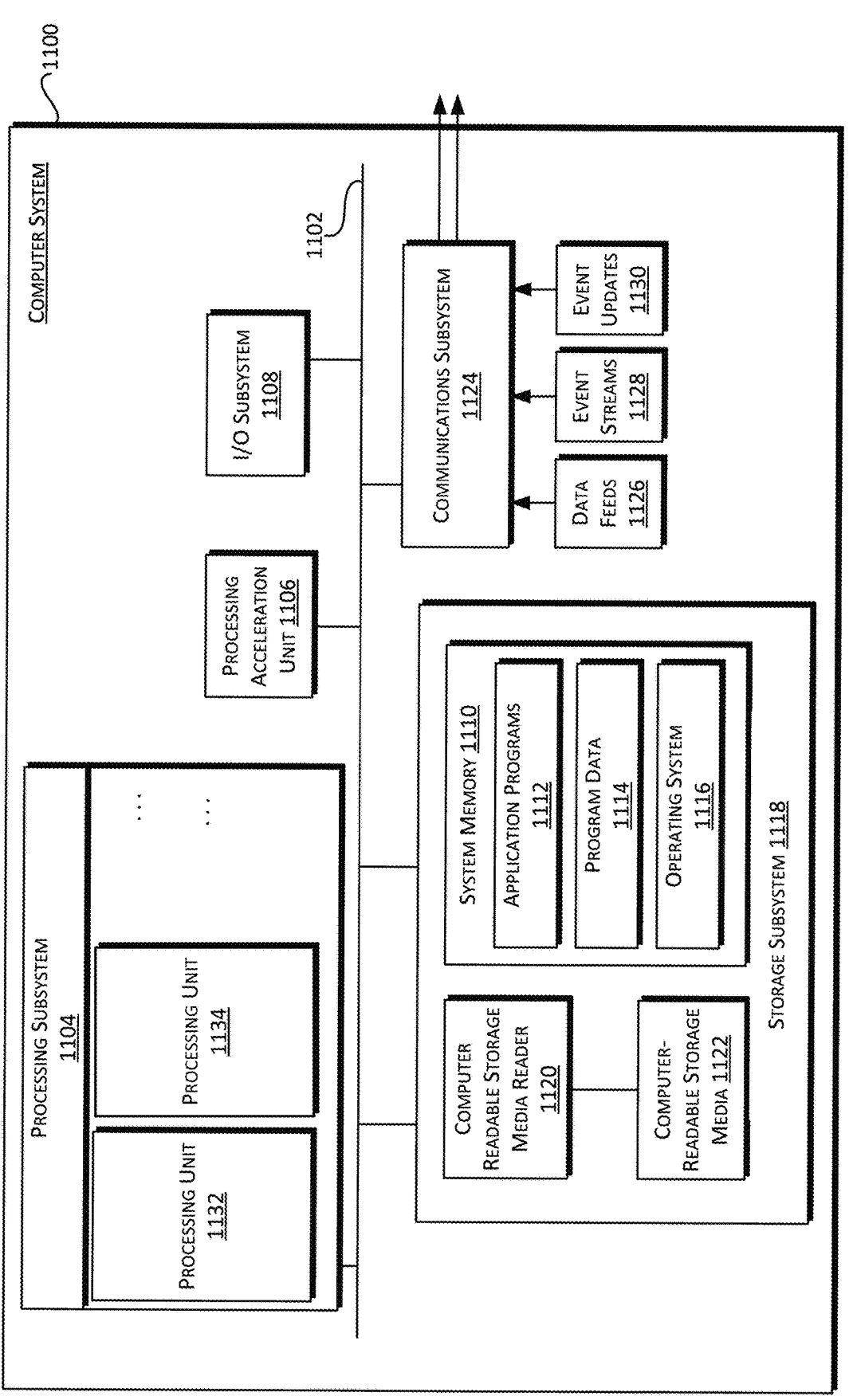
FIG. 11 illustrates an example computer system that may be used to implement certain aspects.

FIG. 11 illustrates an exemplary computer system 1100 that may be used to implement certain aspects. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative aspects of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some aspects, processing subsystem 1104 can include one or more special purpose co-processors such as graphics processors, digital signal processors (DSPs), or the like. In some aspects, some or all of the processing units of processing subsystem 1104 can be implemented using customized circuits, such as application specific integrated circuits (ASICs), or field programmable gate arrays (FPGAs).

In some aspects, the processing units in processing subsystem 1104 can execute instructions stored in system memory 1110 or on computer readable storage media 1122. In various aspects, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain aspects, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some aspects. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1122 may store programming and data constructs that provide the functionality of some aspects. Computer-readable media 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, digital video disc (DVD), a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1118 may also include a computer-readable storage media reader 1120 that can further be connected to computer-readable storage media 1122. Reader 1120 may receive and be configured to read data from a memory device such as a disk, a flash drive, etc.

In certain aspects, computer system 1100 may support virtualization technologies, including but not limited to virtualization of processing and memory resources. For example, computer system 1100 may provide support for executing one or more virtual machines. In certain aspects, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain aspects, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1124 can provide wired network connectivity (e.g., Ethernet) in addition to or instead of a wireless interface.

Communication subsystem 1124 can receive and transmit data in various forms. For example, in some aspects, in addition to other forms, communications subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method comprising:
accessing a database maintained within a cloud environment, the database storing a plurality of public keys, wherein each public key has a corresponding fingerprint, and the database further storing a plurality of fingerprints corresponding to the plurality of public keys, and wherein each public key is associated with either (i) a corresponding user account of a corresponding tenancy of the cloud environment or (ii) a compute instance hosted within a corresponding tenancy of the cloud environment;
determining a number of occurrences of a first public key or a first fingerprint corresponding to the first public key within the database, wherein each occurrence corresponds to a current association of the first public key or the first fingerprint for a respective cloud resource, such that the number of occurrences corresponds to a number of different cloud resources with which the first public key or the first fingerprint is simultaneously associated, each cloud resource comprising a distinct user account or a distinct compute instance, and wherein each occurrence corresponds to association of a user-provided version of the first public key with a respective cloud resource;
determining that the number of occurrences is equal to or greater than a threshold number;
tagging the first public key as being reused for at least the threshold number of occurrences; and
generating an output indicating that the first public key is being reused for at least the threshold number of occurrences.

2. The method of claim 1, wherein the threshold number is a positive integer that is greater than one.

3. The method of claim 1, wherein determining the number of occurrences of the first public key or the first fingerprint corresponding to the first public key within the database comprises:
determining that (i) a first occurrence of the first public key or the first fingerprint is associated with a first user account of a first tenancy of the cloud environment, and (ii) a second occurrence of the first public key or the first fingerprint is associated with a second user account of a second tenancy of the cloud environment.

4. The method of claim 3, wherein the first tenancy and the second tenancy are different tenancies of the cloud environment.

5. The method of claim 4, wherein the first tenancy and the second tenancy are rented out to a same cloud customer, or rented out to a first cloud customer and a second cloud customer, respectively.

6. The method of claim 3, wherein the first tenancy and the second tenancy are a same tenancy of the cloud environment.

7. The method of claim 1, wherein determining the number of occurrences of the first public key or the first fingerprint corresponding to the first public key within the database comprises:

determining that (i) a first occurrence of the first public key or the first fingerprint is associated with a first compute instance hosted within a first tenancy of the cloud environment, and (ii) a second occurrence of the first public key or the first fingerprint is associated with a second compute instance hosted within a second tenancy of the cloud environment.

8. The method of claim 7, wherein the first tenancy and the second tenancy are different tenancies of the cloud environment, or a same tenancy of the cloud environment.

9. The method of claim 1, wherein determining the number of occurrences of the first public key or the first fingerprint corresponding to the first public key within the database comprises:

determining that (i) a first occurrence of the first public key or the first fingerprint is associated with a user account of a first tenancy of the cloud environment, and (ii) a second occurrence of the first public key or the first fingerprint is associated with a compute instance hosted within a second tenancy of the cloud environment.

10. The method of claim 9, wherein the first tenancy and the second tenancy are different tenancies of the cloud environment, or a same tenancy of the cloud environment.

11. The method of claim 1, wherein the first fingerprint is generated from the first public key by applying a hash function to the first public key.

12. The method of claim 1, wherein the first public key is associated with at least (i) a first user account or (ii) a first compute instance, and wherein the method further comprises:

responsive at least in part to the output indicating that the first public key is being reused for at least the threshold number of occurrences, prompting a user of the first user account or the first compute instance to associate a public key, which is different from the first public key, with the first user account or the first compute instance.

13. The method of claim 1, wherein the threshold number is a low threshold number, and wherein the method further comprises:

determining that the number of occurrences is equal to or greater than a high threshold number that is greater than the low threshold number; and generating a request to deactivate or delete one or more user accounts or one or more compute instances associated with the first public key.

14. The method of claim 1, further comprising:

receiving a request to open a first user account or host a first compute instance, the request accompanied by the first public key; and responsive at least in part to (i) the first public key being tagged for being reused for at least the threshold number of occurrences and (ii) receiving the request, rejecting the request and requesting an association of a public key, which is different from the first public key, with the first user account or the first compute instance.

15. The method of claim 1, wherein the database stores the plurality of public keys and the plurality of fingerprints for a single tenancy of the cloud environment.

16. The method of claim 1, wherein the database stores the plurality of public keys and the plurality of fingerprints for a plurality of tenancies of the cloud environment.

17. A non-transitory computer-readable medium including instructions that when executed by one or more processors, cause the one or more processors to perform operations including:

accessing a database maintained within a cloud environment, the database storing a plurality of public keys, wherein each public key has a corresponding fingerprint, and the database further storing a plurality of fingerprints corresponding to the plurality of public keys, and wherein each public key is associated with either (i) a corresponding user account of a corresponding tenancy of the cloud environment or (ii) a compute instance hosted within a corresponding tenancy of the cloud environment;

determining a number of occurrences of a first public key or a first fingerprint corresponding to the first public key within the database, wherein each occurrence corresponds to a current association of the first public key or the first fingerprint for a respective cloud resource, such that the number of occurrences corresponds to a number of different cloud resources with which the first public key or the first fingerprint is simultaneously associated, each cloud resource comprising a distinct user account or a distinct compute instance, and wherein each occurrence corresponds to association of a user-provided version of the first public key with a respective cloud resource;

determining that the number of occurrences is equal to or greater than a threshold number;

tagging the first public key as being reused for at least the threshold number of occurrences; and generating an output indicating that the first public key is being reused for at least the threshold number of occurrences.

18. The non-transitory computer-readable medium of claim 17, wherein the database one of (i) stores the plurality of public keys and the plurality of fingerprints for a single tenancy of the cloud environment, or (ii) stores the plurality of public keys and the plurality of fingerprints for a plurality of tenancies of the cloud environment.

19. A system comprising:

one or more processors;

a storage repository including a database for storing a plurality of public keys, wherein each public key has a corresponding fingerprint, and the database for further storing a plurality of fingerprints corresponding to the plurality of public keys, and wherein each public key is associated with either (i) a corresponding user account of a corresponding tenancy of a cloud environment or (ii) a compute instance hosted within a corresponding tenancy of the cloud environment; and one or more non-transitory computer-readable media storing instructions, which, when executed by the system, cause the system to perform a set of actions including:

accessing the database;

determining a number of occurrences of a first public key or a first fingerprint corresponding to the first public key within the database, wherein each occurrence corresponds to a current association of the first public key or the first fingerprint for a respective cloud resource, such that the number of occurrences corresponds to a number of different cloud resources with which the first public key or the first fingerprint is simultaneously associated, each cloud resource comprising a distinct user account or a distinct compute instance, and wherein each occurrence corresponds to association of a user-provided version of the first public key with a respective cloud resource;

determining that the number of occurrences is equal to or greater than a threshold number;

tagging the first public key as being reused for at least the threshold number of occurrences; and generating an output indicating that the first public key is being reused for at least the threshold number of occurrences.

20. The system of claim 19, wherein the database one of (i) stores the plurality of public keys and the plurality of fingerprints for a single tenancy of the cloud environment, or (ii) stores the plurality of public keys and the plurality of fingerprints for a plurality of tenancies of the cloud environment.

\* \* \* \* \*